US008867402B2

(12) United States Patent
Kikuchi

(10) Patent No.: US 8,867,402 B2
(45) Date of Patent: Oct. 21, 2014

(54) APPARATUS AND METHOD FOR GENERATING TOPOLOGY TREE

(75) Inventor: Shunsuke Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 12/984,355

(22) Filed: Jan. 4, 2011

(65) Prior Publication Data

US 2011/0170402 A1  Jul. 14, 2011

(30) Foreign Application Priority Data

Jan. 14, 2010  (JP) ................. 2010-006028

(51) Int. Cl.
*H04L 12/28* (2006.01)
*H04L 12/26* (2006.01)
*H04L 12/24* (2006.01)

(52) U.S. Cl.
CPC ........ *H04L 43/0829* (2013.01); *H04L 43/0894* (2013.01); *H04L 41/0213* (2013.01); *H04L 41/145* (2013.01); *H04L 41/12* (2013.01)
USPC ........... 370/254; 709/223; 709/218; 709/221; 709/222; 709/219; 370/230; 370/235; 370/236; 370/252; 370/248; 370/237; 370/238

(58) Field of Classification Search
CPC ......... H04L 47/10; H04L 29/06; H04L 45/00; H04L 69/329; H04L 45/04; H04L 45/02; H04L 45/22; H04L 69/16; H04L 69/161; H04L 45/302; H04L 67/2842; H04L 41/12; H04L 67/1002; H04L 45/50; H04L 67/104; H04W 80/00
USPC ......... 370/252, 392, 216, 255, 250, 254, 253, 370/395.21, 235, 389, 401, 238, 338, 400; 709/223, 237, 224, 238, 226, 203, 217, 709/220

See application file for complete search history.

(56) References Cited

U.S. PATENT DOCUMENTS

| 5,606,669 A * | 2/1997 | Bertin et al. ................... 709/223 |
| 7,185,077 B1 * | 2/2007 | O'Toole et al. ............... 709/223 |
| 2003/0076840 A1 * | 4/2003 | Rajagopal et al. ........ 370/395.21 |
| 2009/0180393 A1 * | 7/2009 | Nakamura .................... 370/252 |

FOREIGN PATENT DOCUMENTS

| JP | 2002-77161 A | 3/2002 |
| JP | 2002-077161 A | 3/2002 |
| JP | 2010-68152 A | 3/2010 |

OTHER PUBLICATIONS

Japanese Office Action mailed Jun. 25, 2013 for corresponding Japanese Application No. 2010-006028, with English-language Translation.

* cited by examiner

*Primary Examiner* — Un C Cho
*Assistant Examiner* — Oussama Roudani
(74) *Attorney, Agent, or Firm* — Fujitsu Patent Center

(57) ABSTRACT

From an observed packet, the hop number, which is the number of nodes that the packet has passed through, and a bottleneck bandwidth, which is a bottleneck for transmitting the packet, are determined so as to detect loss failures. Thereby, the subnet that transmitted the observed packet is located as a node in a topology tree on the basis of the determined hop count and bottleneck bandwidth. When a loss failure, by which the packet is lost, is detected, subnets that are inappropriately arranged are extracted from the arrangement in the topology tree of the loss-failure-detected subnet, and the arrangement of the extracted subnets is modified in order to resolve the inappropriateness.

15 Claims, 18 Drawing Sheets

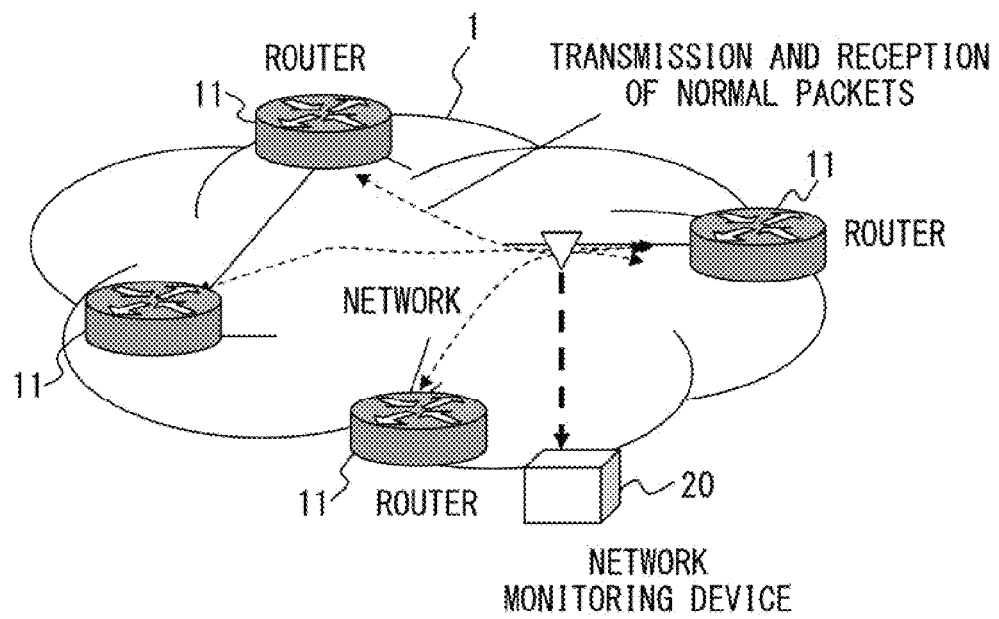
F I G. 1

| VERSION | HEADER LENGTH | TYPE OF SERVICE | PACKET LENGTH | |
|---|---|---|---|---|
| IDENTIFIER | | | FLAG | FRAGMENT OFFSET |
| TIME TO LIVE (TTL) | | PROTOCOL | HEADER CHECKSUM | |
| TRANSMISSION SOURCE ADDRESS | | | | |
| DESTINATION ADDRESS | | | | |
| OPTION | | | PADDING | |

FIG. 3

| PORT NUMBER OF TRANSMISSION SOURCE | | PORT NUMBER OF DESTINATION | |
|---|---|---|---|
| SEQUENCE NUMBER | | | |
| ACKNOWLEDGMENT NUMBER | | | |
| HEADER LENGTH | RESERVATION | FLAG | WINDOW SIZE |
| CHECKSUM | | URGENT POINTER | |

FIG. 4

| HOP COUNT ESTIMATION | | | LAN/WAN | | | LOSS DETECTION | | ESTIMATION RESULT | | |
|---|---|---|---|---|---|---|---|---|---|---|
| OS TYPE | HOP COUNT | NUMBER OF PACKETS | HOST | LAN/WAN DISTINCTION | | HOST | PRESENCE OR ABSENCE OF LOSS | HOP COUNT | LAN/WAN DISTINCTION | PRESENCE OR ABSENCE OF LOSS |
| OS/1 | 15 | 1234567 | 192.168.0.10 | LAN | | 192.168.0.10 | ABSENT | 15 | LAN | ABSENCE |
| OS/2 | 15 | 9876 | 192.168.0.20 | WAN | | ... | ... | | | |
| ... | ... | ... | 192.168.0.30 | LAN | | | | | | |
| | | | 192.168.0.40 | LAN | | | | | | |
| | | | ... | ... | | | | | | |

F I G. 5

| TRANSMISSION SOURCE | | TRANSMISSION DESTINATION | | LAN/WAN DISTINCTION | PRESENCE OR ABSENCE OF LOSS |
|---|---|---|---|---|---|
| ADDRESS | PORT | ADDRESS | PORT | | |
| 192.168.0.10 | 2000 | 10.0.0.5 | 80 | LAN | ABSENT |
| 192.168.0.20 | 3000 | 10.0.0.5 | 80 | WAN | ABSENT |
| ... | ... | ... | ... | ... | ... |

FIG. 6

| NODE ID | PARENT NODE ID | CHILD NODE ID | HOP COUNT | LAN/WAN DISTINCTION | SUBNETS INCLUDED |
|---|---|---|---|---|---|
| 1 | 0 | 2 | 1 | LAN | unknown |
| 2 | 1 | 3 | 2 | LAN | 192.168.30.0 |
| ... | ... | ... | ... | ... | ... |
| 5 | 4 | 6, 11 | 5 | LAN | unknown |
| ... | ... | ... | ... | ... | ... |

F I G. 7

| SUBNET | HOP COUNT | LAN/WAN DISTINCTION |
|---|---|---|
| 192.168.0.0/24 | 15 | LAN |
| 192.168.10.0/24 | 13 | LAN |
| ... | ... | ... |
| | | |

FIG. 8

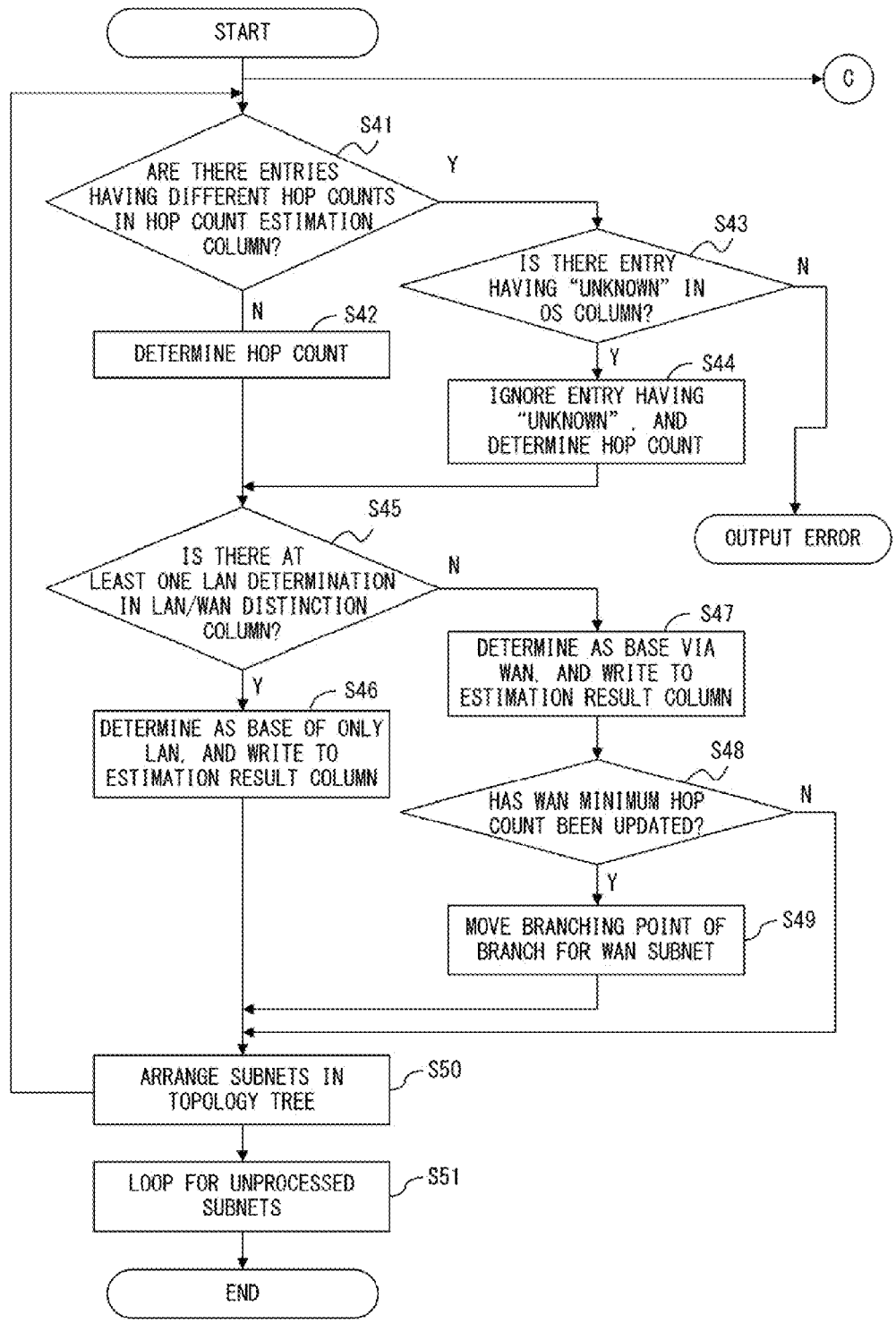
F I G. 1 4 A

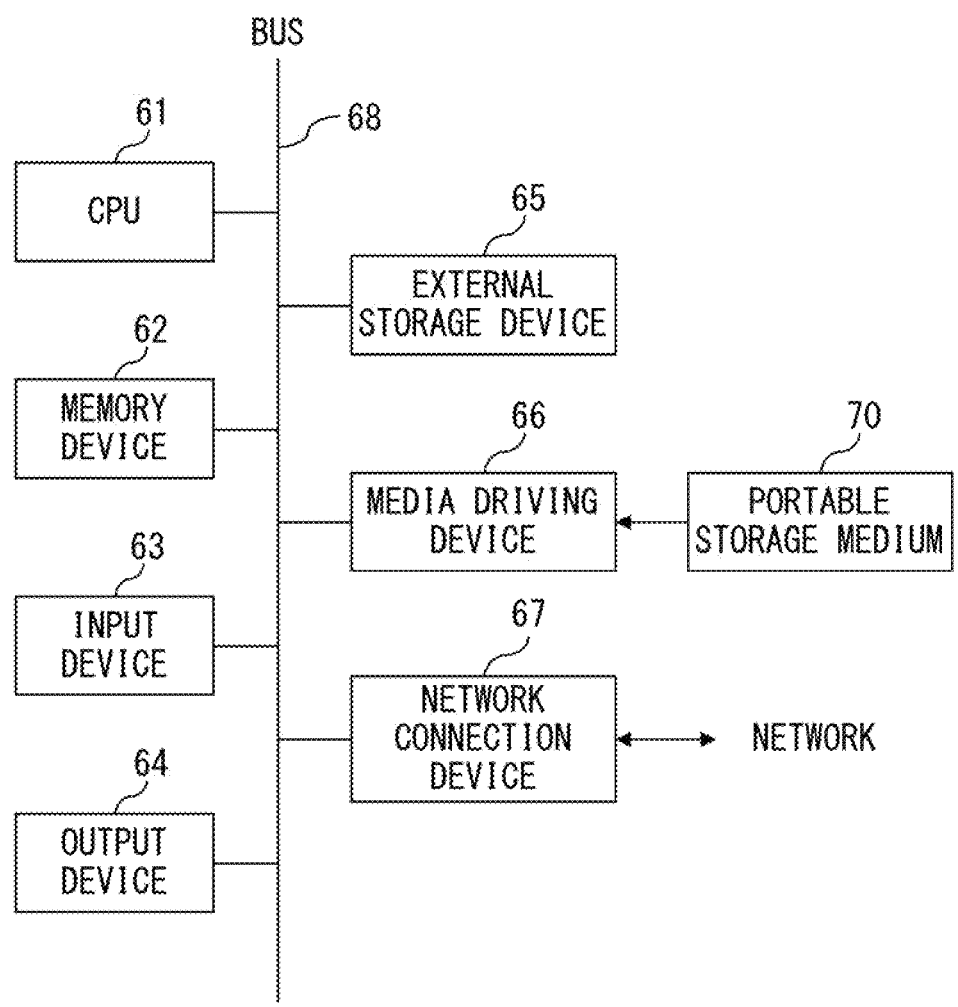
F I G. 15

APPARATUS AND METHOD FOR GENERATING TOPOLOGY TREE

CROSS REFERENCE TO RELATED APPLICATION

This application is based upon and claims the benefit of priority of the prior Japanese Patent Application No. 2010-006028, filed on Jan. 14, 2010, the entire contents of which are incorporated herein by reference.

FIELD

The embodiments discussed herein are related to a technique of determining a topology of a network including subnets connected to each other.

BACKGROUND

Today, networks, represented by the Internet, are widely used for providing various services. When breakdowns in switches, congestion in routers, or the like have caused failures on a transmission route for packets in such services, the receiving quality of packets deteriorates greatly. For example, an increase in a packet loss rate makes it necessary to retransmit packets, which causes problems such as taking a longer time for transmitting packets. This makes it important to rapidly respond to failures on transmission routes (networks). Accordingly, understanding the topology of a network is very important to failure analysis.

In the field of networking, design/construction departments for designing and constructing networks and management/operation departments for managing and operating such networks (responding to failures) are often separated from each other. Management/operation departments often fail to obtain the precise topology information of a network for responding to failures. Usually, it is also difficult for users of a network to obtain the topology information for analyzing the situation. In order to cope with this situation, technologies of determining (estimating) topologies of networks have been discussed in recent years.

Conventional methods of estimating topologies of networks can roughly be classified into three types: an estimation method using traceroute, an estimation method using SNMP (Simple Network Management Protocol), and an estimation method using capture of a routing protocol.

traceroute is an investigating tool (program) for investigating transfer routes from a certain observation point (investigation node) to an arbitrary destination node on a network by transmitting an investigation packet from the investigation node and receiving the response. Accordingly, in an estimation method using traceroute, this tool is used in many destination nodes, and the results obtained from the respective destination nodes are taken together so that the network topology from the investigation node is estimated. "traceroute" used herein is used as a general term for investigation tools that use investigation packets.

SNMP is a protocol for requesting and obtaining statistical information and management information (MIB: Management Information Base) accumulated in nodes on networks. In the estimation method using SNMP, SNMP is used for making requests from the investigation node and obtaining information of MIB from each node on a network, and the obtained pieces of information are taken together so as to estimate the network topology. There are various methods and protocols for obtaining information stored in nodes; however, estimation method using SNMP used herein is meant to include those various methods and protocols.

Routing protocols are for exchanging pieces of routing information. Among routing protocols, the protocols referred to as link state type permit nodes to exchange the topology information of networks and their cost information with each other. Thus, in the estimation method using capture of the routing protocol, the topology is estimated by capturing packets for exchanging at the investigation node. A representative link-state-type routing protocol is OSPF (Open Shortest Path First).

Among the above methods, according to traceroute and the estimation method using SNMP, investigation packets (or requests) have to be transmitted to the network. Such estimation methods are referred to as active search. In networks, administrators sometimes limit packet transmission for investigation on the basis of the administration policies. In such a case, network topologies cannot be estimated using active search.

Also, among the above methods, according to the estimation method using capture of the routing protocol, packets of link-state-type routing protocol have to be flowing through networks. However, there are actually not many such networks. Thus, this estimation method has a low versatility, and in many cases cannot be used for network topology estimations.

In view of this, it is desirable that an estimation of network topologies not be based on transmissions of special packets such as investigation packets or packets of routing protocols. In other words, network topologies are desirably estimated from normal packets that are flowing through networks.

Patent Document 1: Japanese Laid-open Patent Publication No. 2002-77161

SUMMARY

An apparatus according to the disclosure obtains a packet flowing through the network; determines a hop count, which is the number of nodes that the packet has passed through, and a bottleneck bandwidth, which is a bottleneck for transmitting the packet, the determination being performed for each transmission source subnet which transmitted the packet and from the packet obtained by the packet obtainment unit; detects a loss failure by which the packet is lost; arranges, in a topology tree and on the basis of the hop count and the bottleneck bandwidth determined by the analysis unit, subnets that have been confirmed to be the transmission source subnets among subnets existing in the network; and uses a result of loss failure detection by the analysis unit to extract a subnet that has been inappropriately arranged among subnets arranged by the arrangement unit in the topology tree and to modify an arrangement of the extracted subnets. Thereby, the apparatus generates a topology tree simulating a configuration of a network as a result of an estimation (determination) of network topology.

An apparatus according to the disclosure is capable of estimating a network topology highly accurately from normal packets flowing through the network, i.e., of generating a topology tree that simulates the network's configuration highly accurately.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 illustrates a system configuration of a network to which a topology tree generation apparatus according to the present embodiment is applied;

FIG. 3 illustrates a format of the header of a packet;

FIG. 4 illustrates a format of a TCP header;

FIG. 5 illustrates a configuration of a subnet management information list;

FIG. 6 illustrates a TCP connection management information list;

FIG. 7 illustrates a configuration of topology information;

FIG. 8 illustrates a configuration of a simultaneous loss failure occurrence base list;

FIG. 14A illustrates a flowchart of a topology tree configuration process;

FIG. 15 illustrates an example of a hardware configuration of a computer to which the present embodiment can be applied.

DESCRIPTION OF EMBODIMENTS

Figure 2:
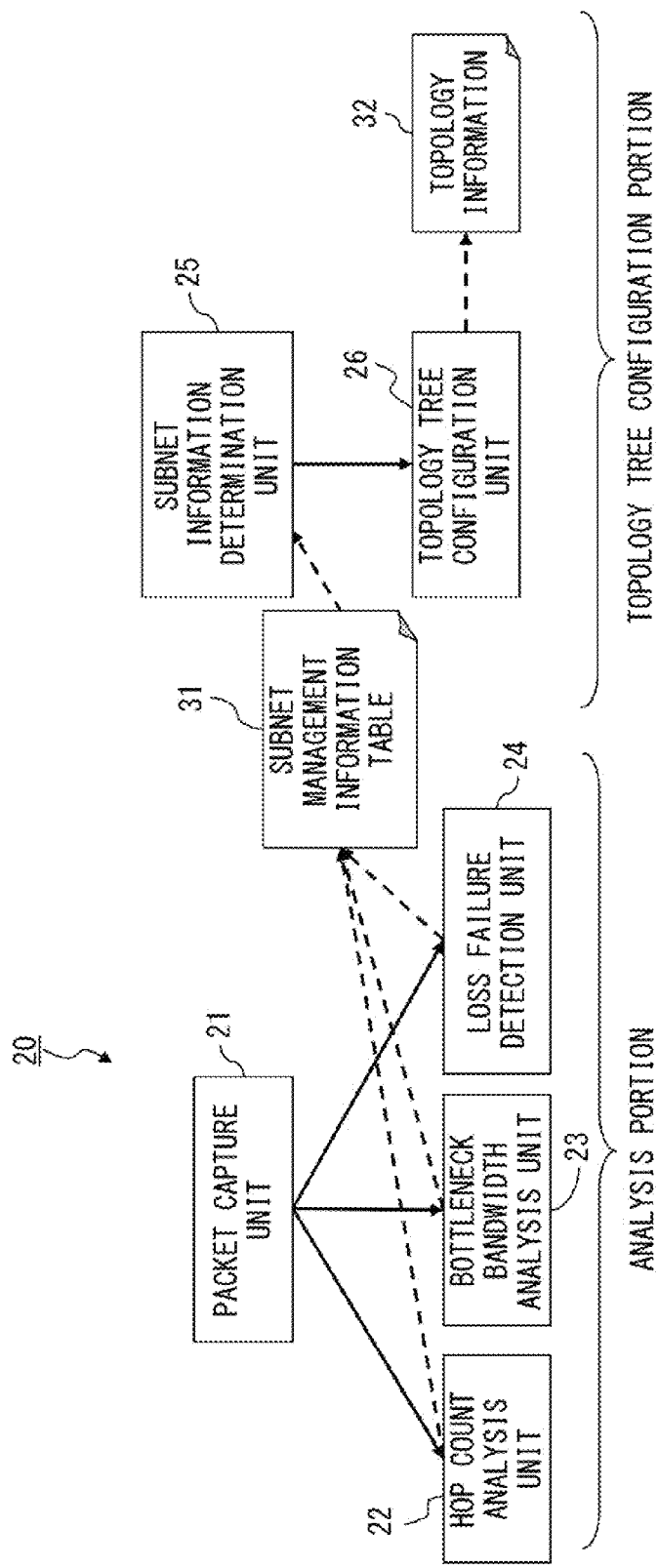
FIG. 2 illustrates a functional configuration of a topology tree generation apparatus according to the present embodiment.

Hereinafter, embodiments of the invention will be explained in detail by referring to the drawings.

FIG. 1 illustrates a system configuration of a network to which a topology generation apparatus according to the present embodiment is applied.

Usually, large-scale networks employ a configuration of interconnecting plural small-scale networks (subnets). A network 1 in FIG. 1 also employs a configuration of interconnecting plural subnets. Thus, this network includes a lot of routers 11, serving as nodes for transferring packets that are flowing through the network 1.

A topology tree generation apparatus according to the present embodiment monitors normal packets flowing through connection portions on the network 1, and estimates (determines) the topology of the network 1 from packets obtained for the monitoring. This topology tree generation apparatus is realized in a form in which it is mounted on a network monitoring device 20 serving for monitoring failures or the like occurring on the network 1. Therefore, unless otherwise noted, "network monitoring device 20" is used to mean a topology tree generation apparatus.

FIG. 2 illustrates a functional configuration of the network monitoring device (topology tree generation device) 20 according to the present embodiment. As illustrated in FIG. 2 the network monitoring device 20 includes a packet capture unit 21, a hop count analysis unit 22, a bottleneck bandwidth analysis unit 23, a loss failure detection unit 24, a subnet information determination unit 25, and a topology tree configuration unit 26.

The packet capture unit 21 captures (obtains) packets flowing on the network 1, and gives the captured packets respectively to the hop count analysis unit 22, the bottleneck bandwidth analysis unit 23, and the loss failure detection unit 24.

The hop count analysis unit 22 estimates (determines) the hop count, which is the number of nodes that the packet has passed through since it was transmitted from the subnet of the transmission source, on the basis of analysis referring to the header of the given packet. The nodes are GW (Gateway) device, the router 11, or the like. For convenience, only the routers 11, which are the most representative as nodes, are assumed in this document.

FIG. 3 illustrates a format of the header of a packet. As illustrated in FIG. 3, the header of a packet contains many fields in addition to the fields for holding the address of the transmission source, which is the data processing apparatus (computer) that transmitted the packet, and for holding the address of the destination, which is the data processing apparatus that functions as the final transmission destination for that packet. One of such fields is a TTL field. Hereinafter, a data processing apparatus serving as a packet transmission source and a packet transmission destination is referred to as "host" generically.

The value held in the TTL field is decremented by one each time the packet passes through the router 11. A packet having that value having become zero is discarded without being transferred. Hosts that transmit packets usually store values as the initial values depending upon the types of operating systems (OSs) executed by those hosts. Examples of such values are 31, 127, 255, etc. Thus, the hop count analysis unit 22 estimates the hop count on the basis of analysis using the value in the TTL field in the packet header.

The network monitoring device 20 monitors packets flowing through the same portion. Accordingly, the number of routers 11 traversed by packets transmitted from respective hosts in the same subnet is equal or approximately equal. This means that the value in the TTL field (TTL value) is within a narrow range depending upon the initial value. In other words, when the number of routers (hop count) is assumed to be x, a TTL value is a value calculated by biasing one of the results of 31−x, 127−x, and 255−x. Thus, the hop count analysis unit 22 estimates (determines) the hop count and also the type of OS from the back calculations using the TTL value for each subnet and each transmission source host. The hop counts and the OS types estimated are stored in a subnet management information table 31.

Pack transmission takes time depending upon the transmission rate. For example, transmitting a 1500-byte-length packet through a transmission line at a transmission rate of 10M [bps] takes 12 [msec], and transmitting the same packet through a transmission line at a transmission rate of 1 G [bps] takes 0.012 [msec]. Also, when the transmission rate of lines changes from 1 G [bps] to 10M [bps] at a node 11 and 1500-byte-length packets are successively transferred to the node 11, some packets have to wait to be transmitted at that node 11 because the transmission times are different between the receiving side and the transmitting side. When, by contrast, the transmission rate of lines changes from 10M [bps] to 1 G [bps] at a node, some packets have to wait to be received due to the difference in transmission time. The size (number of bytes) of each packet is stored in the packet header as packet length.

Because of this, a difference in transmission rate between the receiving and transmitting sides results in a lower transmission rate (bottleneck bandwidth) in the transfer of packets. The time period starting when a packet, the size of the packet length of which is specified in the packet header, is captured and ending when the next packet is captured depends upon the bottleneck bandwidth. For example, when the time period between the observation of a 1500-byte-length packet and the observation of the next packet is 1.2 [msec], the bottleneck bandwidth can be assumed to be 10M [bps]. A bottleneck bandwidth analysis unit 23 estimates the bottleneck bandwidth for each host in this manner. The estimated bottleneck bandwidth is also stored in the subnet management information table 31.

FIG. 4 illustrates a format of a TCP header. As illustrated in FIG. 4, according to protocols that provide highly reliable communications such as TCP (Transmission Control Protocol), the headers according to the protocol are included in packets. The header contains a sequence number field for storing a number for securing the consistency of communication (sequence number). A transmission source host stores, in that field, a value indicating the order at which each packet is transmitted. Thereby, the destination host can find that some packets have been lost and can determine the lost packets from the sequence numbers in received packets.

A loss failure detection unit 24 obtains, for each transmission source host for example, the total number of packets transmitted from the transmission source host to the destination host and the total number of lost packets, and calculates the rate (=total number of lost packets/total number of transmitted packets) as a loss rate. By comparing this obtained loss rate with a prescribed threshold value, a loss failure is detected. Thereby, when the obtained loss rate is higher than a threshold value, a loss failure is determined to have occurred. The determination results of a loss failure are also stored in the subnet management information table 31. Hereinafter, a threshold value for determining whether or not a loss failure has occurred is referred to as a "loss determination threshold value". Methods other than this may be used for detecting loss failures.

FIG. 5 illustrates a configuration of the subnet management information table 31. This subnet management information table 31 is for storing and managing, for each subnet, subnet management information, i.e., information obtained by observing packets transmitted from that subnet, and estimation results obtained by analyzing such information. As illustrated in FIG. 5, the subnet management information table 31 employs a data configuration including columns (items) for hop count estimation, LAN/WAN, loss detection, and estimation results. To facilitate the understanding, FIG. 5 illustrates only the subnet management information for one subnet.

In the LAN/WAN column, an entry is prepared for each host. In the hop count estimation column, the loss detection column, and the estimation result column, at least one entry is prepared for each entry of the LAN/WAN column. Thereby, observation results and the like can be managed and stored for each combination of hop counts and OS types that have been estimated.

The hop count estimation column contains sub-columns for OS type, hop count, and the number of packets. The number-of-packets sub-column stores the total number of packets transmitted from the transmission source host.

The LAN/WAN column contains the sub-columns for host, and the distinction between LAN and WAN. The host sub-column stores addresses of transmission hosts (host addresses), and the distinction between LAN and WAN sub-column stores types of subnets determined from estimated bottleneck bandwidths. In the present embodiment, estimated bottleneck bandwidths are compared with a prescribed threshold value, and thereby whether each subnet is a LAN or a WAN is determined. Thereby, when an estimated bottleneck bandwidth is higher than the threshold value, the subnet is determined to be a LAN, which yields a higher transmission rate. Hereinafter, this threshold value is referred to as a "LAN/WAN determination threshold value". As classifications between the types of subnets according to estimated bottleneck bandwidths, classifications other than an either-or choice may be used. In other words, it is also possible to select one of three or more types.

The reason for determining the type of a subnet in an either-or choice manner is that it is not so necessary to directly use the value estimated as a bottleneck bandwidth. When a packet has passed through other subnets, all subnets traversed by that packet influence the estimation of the bottleneck bandwidth. This often causes comparatively large errors in the estimation of bottlenecks. This is also one of the reasons.

The loss detection column includes a sub-column for storing a presence or absence of losses. The presence-or-absence-of-loss column stores information indicating whether or not there is a loss failure determined on the basis of the loss rate obtained in the above described method. "ABSENT" in FIG. 5 means that it has been determined that no loss failures have occurred, i.e., no loss failures have been detected. When a loss failure has been determined to have occurred, information indicating that occurrence is stored. Hereinafter, information written on the basis of a determination that no loss failures have occurred is "ABSENT", and information written on the basis of a determination that a loss failure has occurred is "PRESENT".

The estimation-result column includes sub-columns for hop count, a distinction between LAN and WAN, and a presence or absence of losses. Each sub-column stores the final estimation result for the entire corresponding subnet. Thus, what is written in these sub-columns are not necessarily the same as what is written in sub-columns having the same names in other columns.

As is well known, the address expressing the location of a computer according to TCP/IP (IP address) includes the address of the subnet in which that computer exits (network address) and the address of that computer in the subnet (host address). Thus, in the subnet management information table 31, the subnet management information for one subnet is determined from a network address.

FIG. 6 illustrates a configuration of a TCP connection management information list. This list is for storing, for each TCP connection for transmitting and receiving captured packets, information related to TCP connection (TCP connection management information). FIG. 6 illustrates information for only one subnet for the sake of convenience. Each entry (record) stores, as TCP connection management information, combinations of addresses and port numbers of transmission sources and transmission destinations, the distinction between LAN and WAN, and the presence or absence of losses. Other information stored includes, although not illustrated, the numbers of packets last received, the total number of received packets (referred to as "received packet total number" hereinafter), and the total number of lost packets (i.e., cumulative values, and referred to as "lost packet total number" hereinafter). Thereby, the contents of the respective sub-columns for the LAN-WAN distinction and the presence or absence-of-loss are stored for each TCP connection.

As described above, the subnet management information table 31 illustrated in FIG. 5 is updated by the hop count analysis unit 22, the bottleneck bandwidth analysis unit 23, and the loss failure detection unit 24. The TCP connection management information list illustrated in FIG. 6 is updated by, for example, the loss failure detection unit 24.

The packet capture unit 21, the hop count analysis unit 22, the bottleneck bandwidth analysis unit 23, and the loss failure detection unit 24 constitute an analysis portion that captures packets, extracts necessary information from the captured packets, and conducts various estimations using the extracted information. The subnet information determination unit 25 and the topology tree configuration unit 26 refer to the subnet management information table 31 obtained by this analysis portion, and generate a topology tree configuration portion that estimates the configuration of the topology of the network 1. In the present embodiment, the topology configuration of the network 1 is expressed using a tree that is based on a simulated topology configuration (topology tree). This topology tree is based on a view from the network monitoring device 20.

The subnet information determination unit 25 refers to the subnet management information table 31 for example once in a prescribed time period so as to determine whether or not the subnet management information table 31 has been updated. And, when an update has been conducted on the subnet management information table 31, that fact is reported to the topology tree configuration unit 26.

The topology tree configuration unit 26 generates and updates a topology tree in which subnets registered on the subnet management information table 31 are arranged as nodes. The generated or updated topology tree is output or stored as topology information 32. The arrangement of subnets or nodes is determined taking into consideration the hop count and the bottleneck bandwidth (types of the subnets).

The bottleneck bandwidth varies depending upon whether a subnet that packets pass through is a LAN or a WAN. Some of packets that have passed through a subnet having a loss failure are lost. Using this phenomenon, the scope of subnets that packets pass through can be narrowed by extracting subnets that are affected by loss failures. On the basis of the result of that narrowing, inappropriate portions in the current topology tree can be modified. Thereby, an update of a topology tree includes not only an addition of subnets but also a rearrangement, i.e., a changing of the arrangement of already-existing subnets.

Figure 9:
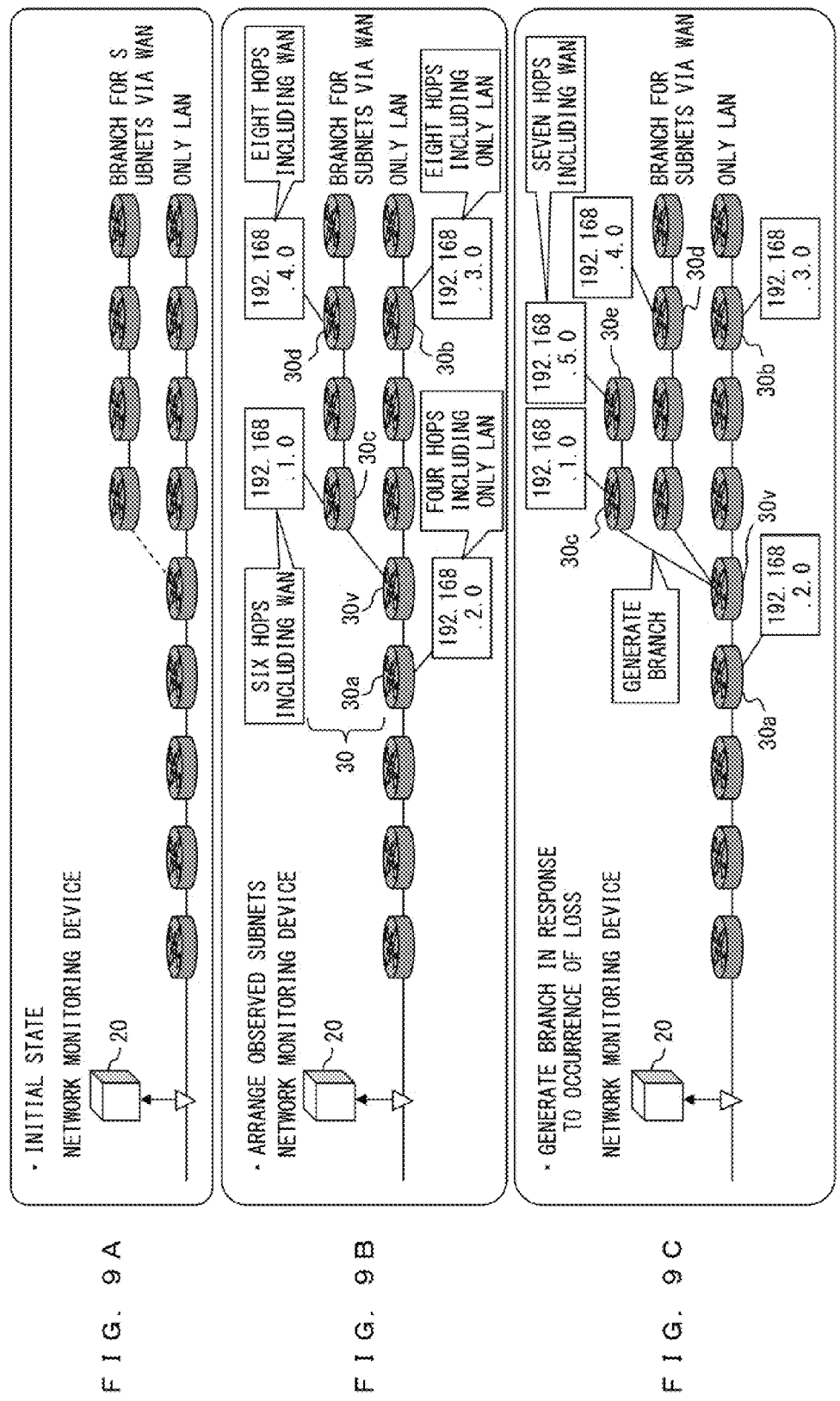
FIGS. 9A through 9C illustrate a manner of generating/updating a topology tree.

FIGS. 9A through 9C illustrate a manner of generating and updating a topology tree. FIG. 9A illustrates the initial state of a topology tree, FIG. 9B, illustrates an example of a topology tree after arranging subnets that have been observed to have packets, and FIG. 9C illustrates an example of a topology tree after changing the arrangement of subnets due to the occurrence of a loss failure. Each node 30 in FIGS. 9A through 9C corresponds to a subnet that has been observed to have packets. In practice, each node 30 corresponds to the router 11.

In the present embodiment, as illustrated in FIG. 9A, the topology tree in the initial state has one main tree (trunk), and one branch having a group of subnets that have been estimated to be WANs arranged thereon (WAN branch) is branched from the main tree. The main tree expresses packet transmission routes to which all LAN-type subnets are connected.

Each branch is managed according to the branch management information. In addition to, for example, identification information for uniquely identifying the corresponding branch, this branch management information includes the hop count (the number of branching hops) based on the network monitoring device 20 of a point (node) at which the corresponding branch is branched from the main tree or from other branches and node information expressing respective nodes that constitute the branch. As identification information, the network address of at least one of the subnets that constitute the corresponding branch or a set of the network addresses of all subnets for example can be used. The number of branching hops is a value obtained by subtracting one from the hop count based on the network monitoring device 20 of the node (subnet) closest to the network monitoring device 20 in the branch. As the node information of each node, the network address of each node, a node ID that is uniquely assigned, or the like can be used. By preparing beforehand one piece of branch management information such as this, the topology in the initial state can be generated.

A host address is in the form including the network address of the subnet and a number string unique to the host in the subnet added to the network address. Thus, a network address can be obtained by extracting the necessary portion from the host address.

FIG. 9B illustrates four nodes 30a through 30d having number strings each starting with "192.168". These nodes 30a through 30d correspond to subnets observed to have packets. Each number string expresses the network address of the subnet or the host address. The nodes 30a and 30b correspond to subnets determined, from the bottleneck bandwidths, to be LANs, while the nodes 30c and 30d correspond to subnets determined to be WANs. Thus, the nodes 30a and 30b are located at positions determined by the hop counts in the main tree, and the nodes 30c and 30d are located at positions determined by the hop counts on the WAN branch. All leaf nodes at the terminal points correspond to subnets observed to have packets. The branching hop count of the branch having the node 30c is five.

In this described manner, in the present embodiment, positions at which subnets (or nodes 30, which are actually the routers 11 for relaying packets when packets flow through the subnets) can be located in the topology tree are limited. Thus, subnets are arranged so that there will be no inconsistency between the arrangement and the estimated bottleneck bandwidths. Because positions at which subnets can be located are limited, respective subnets can be arranged more appropriately than when there are no such limitations. Hereinafter, the positional relationships between subnets (nodes 30) are expressed using the network monitoring device 20 as the base point. Thus, the side closer to the network monitoring device 20 is referred to as the front side, and hop counts are expressed in the form of values counted from the network monitoring device 20 side.

The time needed to transmit packets for example is not information that helps estimate the transmission rates of individual subnets that those packets have passed through. Thus, the above described limitations cannot be used. This deteriorates the accuracy of arranging respective subnets.

In FIG. 9C, a new node 30e has been added. The nodes 30c and 30e are on a WAN branch that is not the same as the WAN branch having the node d, but it is branched from the same node 30v as the WAN branch having the node d is branched from. This is because observation of packets transmitted from the subnets respectively corresponding to, for example, the nodes 30c and 30e confirmed the occurrence of loss failures only in those subnets. In this manner, in the present embodiment, when a loss failure has been detected in a subnet that corresponds to a portion of nodes constituting existing branches, a branch including all of those nodes is generated so as to realize rearrangement of nodes in such a manner that the rearrangement does not conflict with results of the loss failure detections.

In the previous arrangement, the node 30e was located, for example, at the position that was occupied by the node 30d immediately prior. In that previous arrangement, the hop count of the corresponding subnet is seven, and the hop count of the subnet corresponding to the node 30d is eight. If this positional relationship (connection relationship) exists in reality, a loss failure occurring in the subnet corresponding to the node 30c affects packets transmitted from the subnet corresponding to the node 30d. In view of this, it is possible to consider that when a loss failure is not observed in packets transmitted from the subnet corresponding to the node 30d, the packets transmitted from that subnet are transmitted without passing through the subnet corresponding to the node 30e. This means that the current arrangement in which the nodes 30d and 30e constitute the transmission route is not appropriate. Thus, a modification of an arrangement (rearrangement) in which a WAN branch is generated (added) newly so as to move the existing two nodes 30c and 30e to the added WAN branch is performed.

In this manner, in the present embodiment, the connection relationship between subnets in the scope affected by a loss failure is estimated on the basis of that loss failure, and thereby nodes arranged inappropriately in the estimated topology (topology tree) of the network 1 are extracted so as to modify the arrangement. A loss failure may happen in any of the subnets. As time elapses, the number of subnets not having a loss failure decreases. Accordingly, it is made possible to estimate topologies highly accurately, i.e., to generate a highly accurate topology tree. Hereinafter, "node" is used as a word having the same meaning as "subnet" unless otherwise noted.

The generated topology tree is output or stored as the topology information 32. FIG. 7 illustrates a configuration of the topology information 32.

As illustrated in FIG. 7, the topology information 32 illustrates the connection relationships or the like in the topology tree between corresponding nodes and other nodes. In the present embodiment, this node management information includes the node IDs assigned to the respective nodes, the IDs of parent nodes (nodes on the front side of the network monitoring device 20), the IDs of child nodes (nodes on the back side of the network monitoring device 20), the hop counts, the distinction between LAN and WAN, and the addresses of included subnets. The hop counts are based on the network monitoring device 20, and "1" as the hop count means the first node counting from the network monitoring device 20 (which corresponds to the root node). The addresses of included subnets are network addresses.

The number of child nodes varies depending upon their arrangement in the topology tree. Leaf nodes, for example, have no child node or have one fixed value because they are located at terminal points. Nodes to which branches are connected have more child node IDs according to the number of branches connected. The number of child node IDs of the node 30v in FIG. 9C, for example, is "3". For the other nodes, the number of child nodes is "1".

Nodes observed to have packets are arranged in accordance with the estimated hop counts. In some cases, the arrangement of nodes observed to have packets alone does not make it possible to arrange packets according to the estimated hop counts. Specifically, when, for example, there is only one subnet observed to have a packet and the hop count estimated in that subnet is ten, nine subnets that are not observed to have packets have to be located on the front side of that subnet. Because of this, the network addresses stored as included subnets are data indicating whether or not an observed subnet has a packet. The expression "unknown" in FIG. 7 means that the subnet is not observed to have a packet. Only nodes in subnets observed to have packets are extracted from among nodes arranged inappropriately in the topology tree.

The topology information 32 is configured as above. Accordingly, the generating of a topology tree (including updating) corresponds to a manipulation of at least one piece of node management information, i.e., addition, deletion, and updating of the information.

FIG. 8 illustrates a configuration of a simultaneous-loss-failure-occurrence base list. This list is generated in order to respond to the occurrence of loss failures, and stores, for each subnet, the address, the hop count, and the distinction between LAN and WAN in one entry (record).

The topology tree configuration unit 26 refers to the subnet management information table 31 to extract all pieces of subnet management information whose presence-or-absence-of-loss sub-column in the estimation result column has "PRESENT", and generates a simultaneous-loss-failure-occurrence base list. Thus, this list too is used for updating topology trees.

Figure 13A:
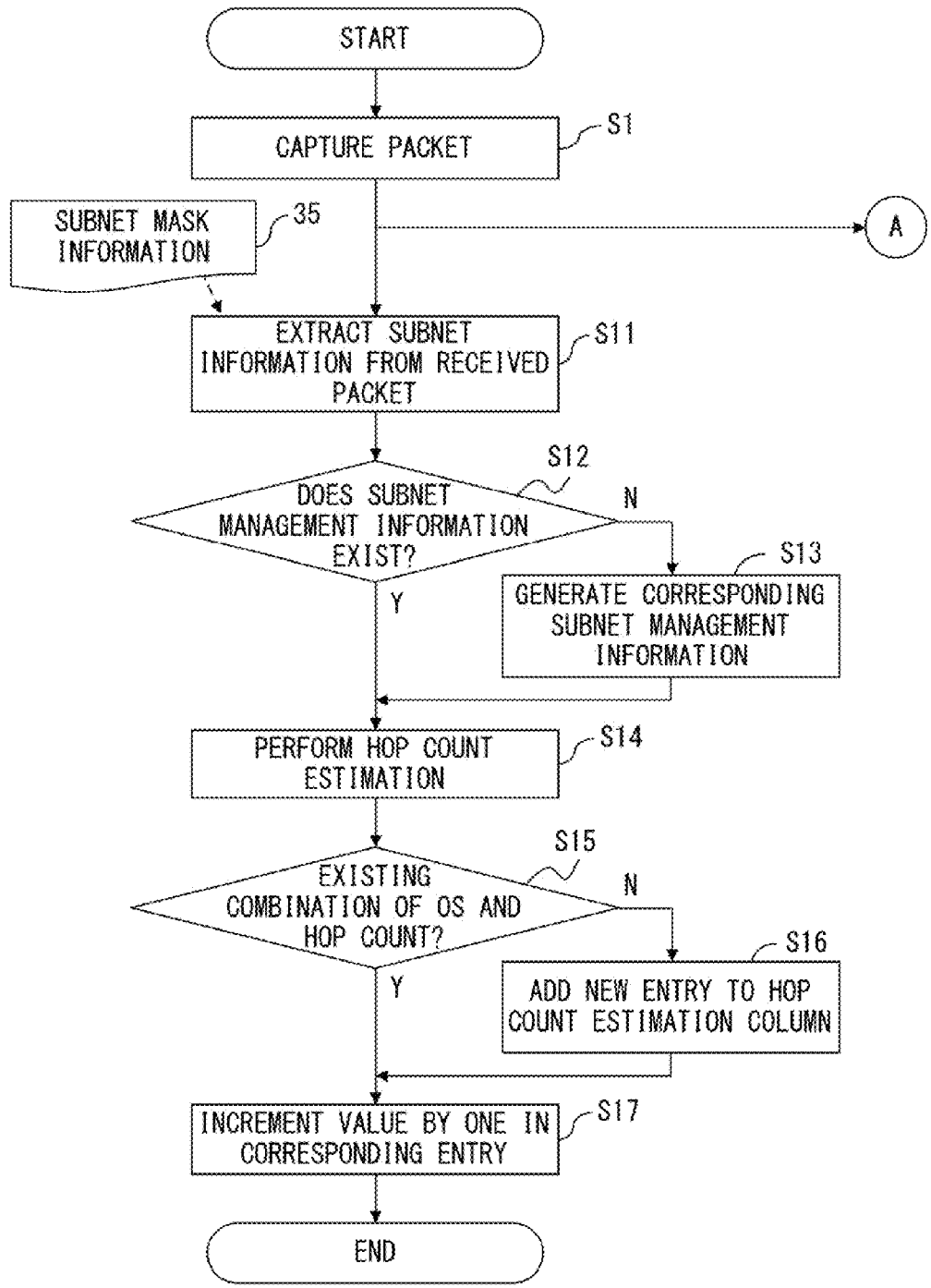
FIG. 13A illustrates a flowchart of a packet analysis process.
Figure 13B:
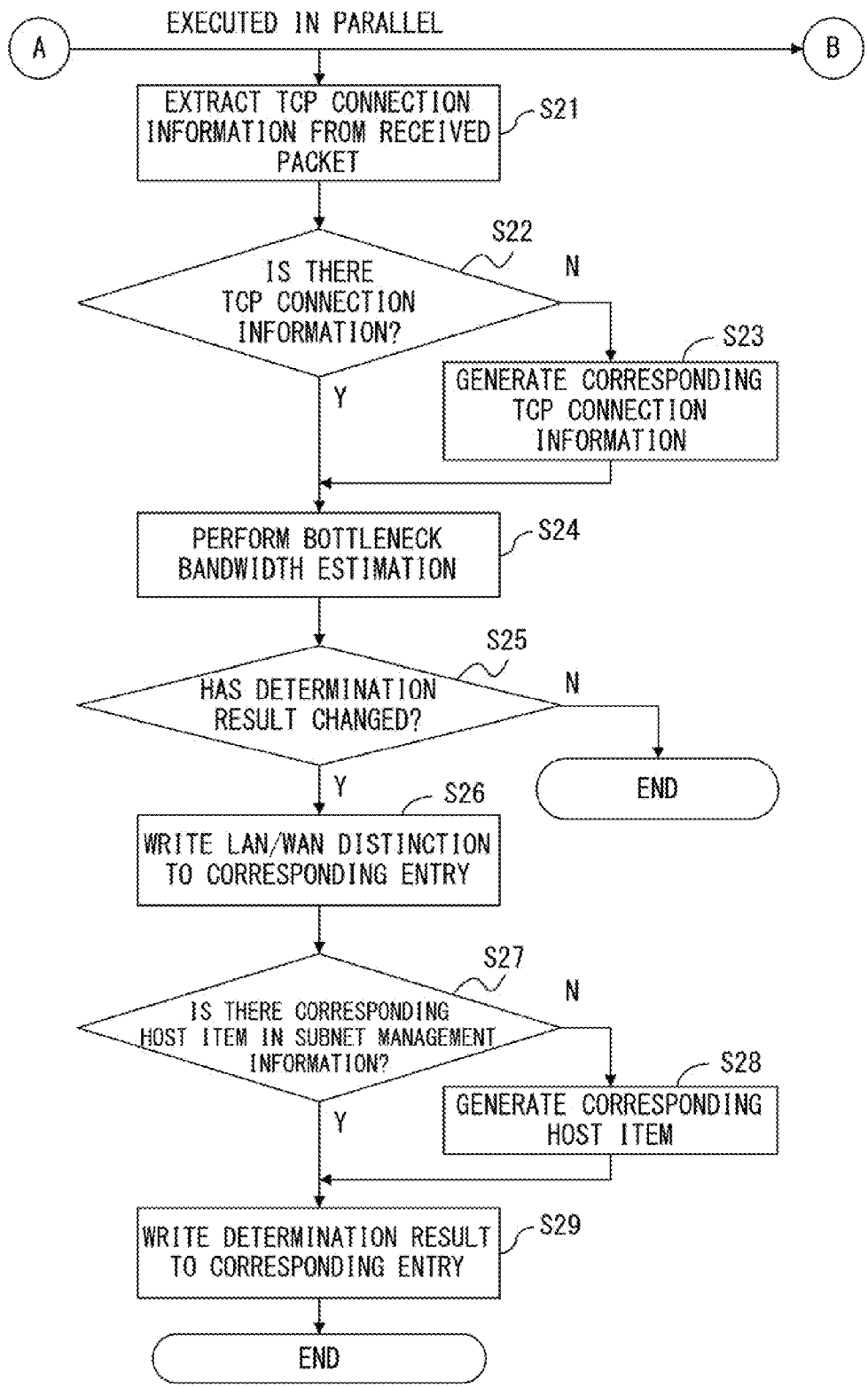
FIG. 13B illustrates a flowchart of a packet analysis process.
Figure 13C:
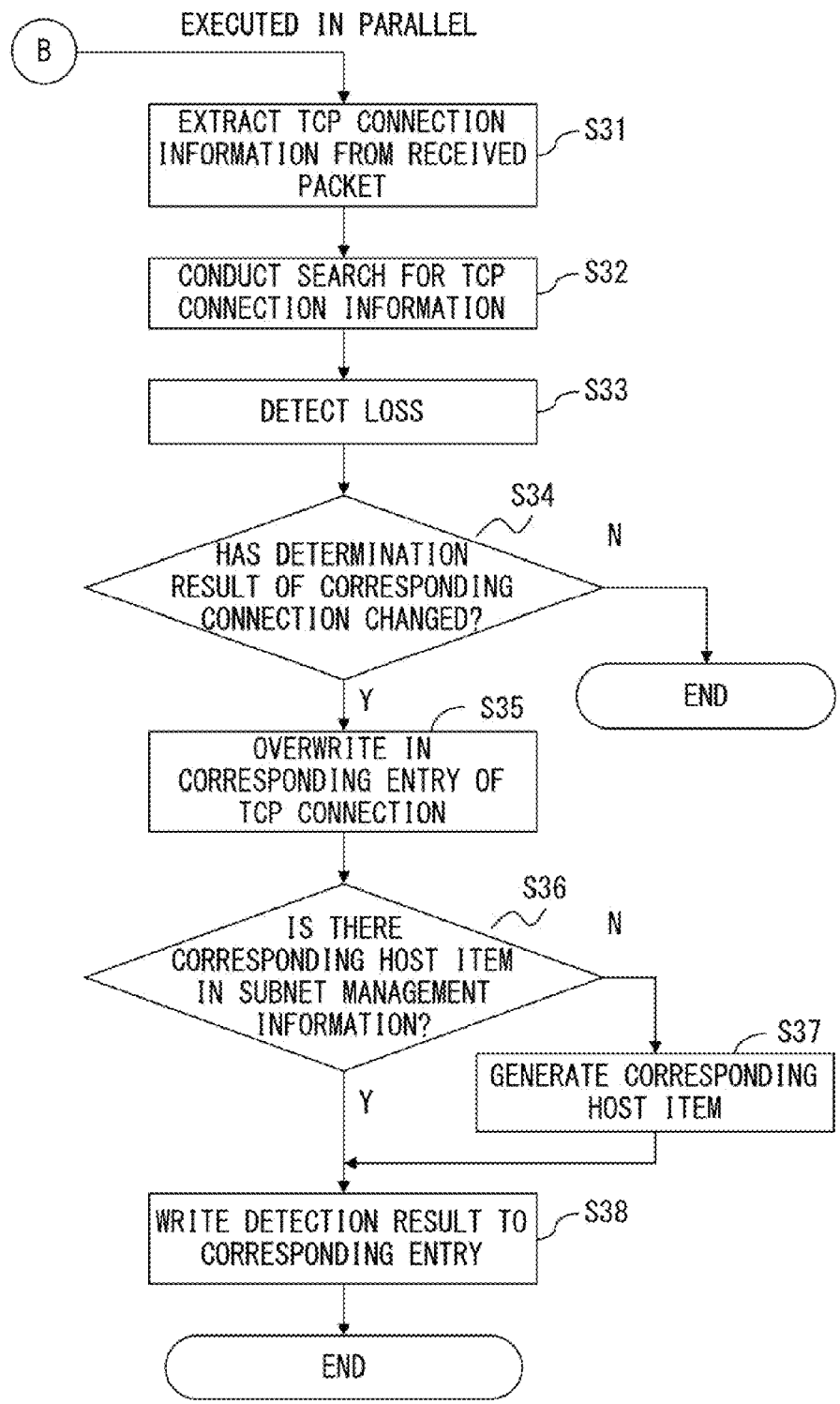
FIG. 13C illustrates a flowchart of a packet analysis process.

FIGS. 13A through 13C are flowcharts for a packet analysis process. This analysis process includes only a step of observing packets flowing through the network 1 and a step executed by the network monitoring device 20 in order to analyze the information obtained through that observation. Process steps in this analysis process are realized by the network monitoring device 20 executing programs having the above functions (packet monitoring program). The packet capture unit 21, the hop count analysis unit 22, the bottleneck bandwidth analysis unit 23, and the loss failure detection unit 24 that constitute the analysis portion are realized as a result of execution of this program by the network monitoring device 20. Next, FIGS. 13A through 13C are referred to in order to explain this process in detail.

In this analysis process, the packet capture unit 21 is realized by executing step S1. Similarly, the hop count analysis unit 22, the bottleneck bandwidth analysis unit 23, and the loss failure detection unit 24 are realized by executing steps S11 through S17, steps S21 through S29, and steps S31 through S38, respectively. In practice, steps S11 through S17, steps S21 through S29, and steps S31 through S38 are executed by different subprograms, respectively, and those subprograms are called and executed by, for example, the process in which step S1 is executed.

First, in step S1, packets flowing through the network 1 are captured. When a packet is able to be captured, the processes in and after steps S11, S21 and S31 are executed. These transitions to steps S11, S21, and S31 correspond to a giving of the packet captured by the packet capture unit 21 to the hop count analysis unit 22, the bottleneck bandwidth analysis unit 23, and the loss failure detection unit 24, respectively. When a packet is not able to be captured, the packet analysis process is terminated, although this is not illustrated. Captured packets are referred to as "received packets" hereinafter.

In and after step S11, the processes as described below are executed.

First, in step S11, subnet mask information 35 is referred to, and the subnet information, i.e., the network address of the transmission source subnet that transmitted the received packets, is extracted. This subnet mask information 35 expresses the scope of network addresses from among transmission source addresses stored in the received packets. Thus, network addresses are extracted in the scope expressed by the subnet mask information 35 from among transmission source addresses in the received packets. After extracting network addresses in this manner, the process proceeds to step S12.

In step S12, it is determined whether or not subnet management information including the extracted network address is included in the subnet management information table 31. When information including that network address is among addresses stored as data of a host sub-column, the determination result is YES, and the process proceeds to step S14. When there is not such an address, the determination result is No, and the process proceeds to step S13, where the subnet management information of the transmission source subnet that transmitted the received packet is generated to be stored in the subnet management information table 31. Thereafter, the process proceeds to step S14. Subnet management information generated then is a transmission source address, and this transmission source address is stored by adding one entry (record) respectively to the LAN/WAN column and the loss detection column in the subnet management information table 31.

In step S14, as described above, the hop count and the OS type are estimated from the value in the TTL field in the received packet. Next, the process proceeds to step S15, and it is determined whether or not the combination of the estimated hop count and OS type has already existed. If that combination already exists in an entry of the hop count estimation column in the subnet management information, the determination result is YES, and the process proceeds to step S17. When there is not such a combination, the determination result is NO, and the process proceeds to step S16, where one entry is added to the hop count estimation column so as to store the estimated hop count and OS type. Thereafter, the process proceeds to step S17.

Usually, estimations of hop counts and OS types require plural received packets. Thus, it is not always possible to estimate hop counts and OS types. Thus, before an estimation is performed, data expressing that estimation has not been performed is stored as a hop count and OS type. This data is also referred to as "unknown" here.

In step 17, the value in the number-of-packet sub-column in the hop count estimation column is incremented. Thereby, the total number of packets actually received from among packets transmitted from subnets is stored in this number-of-packet sub-column. After this increment, the processes in and after step S11 are terminated.

Next, FIG. 13B is referred to so as to explain the processes in and after step 21 in detail.

In step S21, the address and port number of the transmission source, and the address and the port number of the transmission destination, are extracted from the received packet. In the next step, S22, the TCP connection management list is searched using combinations of the extracted addresses and port numbers of the transmission source and the transmission destination in order to determine whether or not there is a piece of TCP connection information that has this combination. When there is apiece of TCP connection information having that combination, the determination result is YES, and the process proceeds to step S24. When there is not such a piece of TCP connection information, the determination result is NO, and the process proceeds to step S23, and generates a piece of TCP connection information having that combination so as to add that piece to the TCP connection information list. Thereafter, the process proceeds to step S24. In the piece of TCP connection information generated then, LAN and NO are set as the initial values respectively for the LAN/WAN distinction and the presence or absence of loss.

In step S24, as described above, the bottleneck bandwidth is estimated and whether the network is LAN or WAN is determined from the estimation result. In the next step, S25, the result of the determination about whether the network is LAN or WAN is compared with the LAN/WAN distinction column in the corresponding entry (TCP connection management information) in the TCP connection management information list in order to determine whether or not the determination result has changed. When these LAN/WAN discriminations are different from each other, the determination result is YES, and the process proceeds to steps S26. When they correspond to each other, the determination result is NO, and then the processes in and after step S21 are terminated.

In step S26, a new value, i.e., the current determination result, is newly written to the LAN/WAN distinction column in the corresponding entry of the TCP connection management information list. This determination result is written also as in a sub-column of the LAN/WAN distinction in the entry that has stored the transmission source address in the subnet management information table 31. In the next step, S27, the entry of the LAN/WAN column is read from the subnet management information table 31, and whether or not the transmission source address of the received packet exists is determined. When that transmission source address exists as data in the host sub-column in any entry, the determination result is YES, and the process proceeds to step S29. When the transmission source address does not exist, the determination result is NO, and the process proceeds to step S28 so as to add one entry respectively to the LAN/WAN column and the loss detection column and to store the transmission source address and the data in the host sub-column in each column.

In step S29, the entry of the LAN/WAN distinction sub-column of having the transmission source address of the received packet is rewritten. After the rewriting, the processes in and after step S21 are terminated.

The above rewriting is performed by extracting the entry by searching the TCP connection management information list using the transmission source address of the received packet, and by determining, on the basis of what is in the extracted entry of the LAN/WAN distinction column, what is to be written to the LAN/WAN distinction sub-column. This determination is performed, for example, by selecting the network that appears more frequently in the LAN/WAN distinction columns in the entries extracted from the TCP connection management information list or by selecting LAN when at least one LAN appears in the columns. The latter is based on an idea whereby transmission rate would not become higher although it could become lower. This determination may be performed by using other methods.

Finally, FIG. 13C is referred to so as to give detailed explanations for the processes in and after step S31.

In this step S31, the address and port number of the transmission source, and the address and port number of the transmission destination, are extracted. In the next step, S32, the TCP connection management information list is searched using the combinations of the extracted addresses and port numbers of the transmission source and the transmission destination so as to extract the entries storing those combinations. After that extraction, the process proceeds to step S33.

In step S33, the total number of received packets in the extracted entry is incremented or the total number of lost packets is updated, and the loss failures that have occurred are detected. This detection is performed in the above described manner, i.e., by calculating the loss rate by dividing the lost-packet total number stored in the extracted entry by the received-packet total number, and comparing the calculated loss rate with the loss determination threshold value. Thereafter, the process proceeds to step S34.

When there is a loss of a packet, there occurs a difference of two or greater between the sequence number of the extracted entry and that of the received packet. Thus, the number of lost packets is updated by subtracting one from the difference (i.e., the difference minus 1) and adding the result to the current total number of lost packets. In order to prevent past loss failures from affecting the system for a long time, it is desirable that the total number of received packets and lost packets be cleared, for example one time at each interval of regular intervals.

In step S34, the detection result is compared with the corresponding entry of the TCP connection management list in the presence-or-absence-of-loss column so that whether or not the result of detecting loss failures has changed is determined. When they correspond to each other, the determination result is NO, and the processes in and after step S31 are terminated. When they do not correspond, the determination result is YES, and the process proceeds to step S35.

In step S35, the detection result is newly written in the presence-or-absence-of-loss column in the corresponding entry. In the next step, S36, the subnet management information table 31 is referred to so as to determine whether or not there is an entry that has stored the transmission source address of the received packet as data in the host sub-column of the LAN/WAN column. When there is an entry that has that transmission source address as data in the host sub-column, the determination result is YES, and the process proceeds to step S38. When there is not such an entry, the determination result is NO, and the process proceeds to step S37, and one entry is generated in the LAN/WAN column so that at least that transmission source address is stored as data in the host sub-column. Thereafter, the process proceeds to step 38.

In step S38, the result of detecting loss failures is written as data in the presence-or-absence-of-loss sub-column in the entry storing the above transmission source address. After that writing, the processes in and after step S31 are terminated.

Figure 14B:
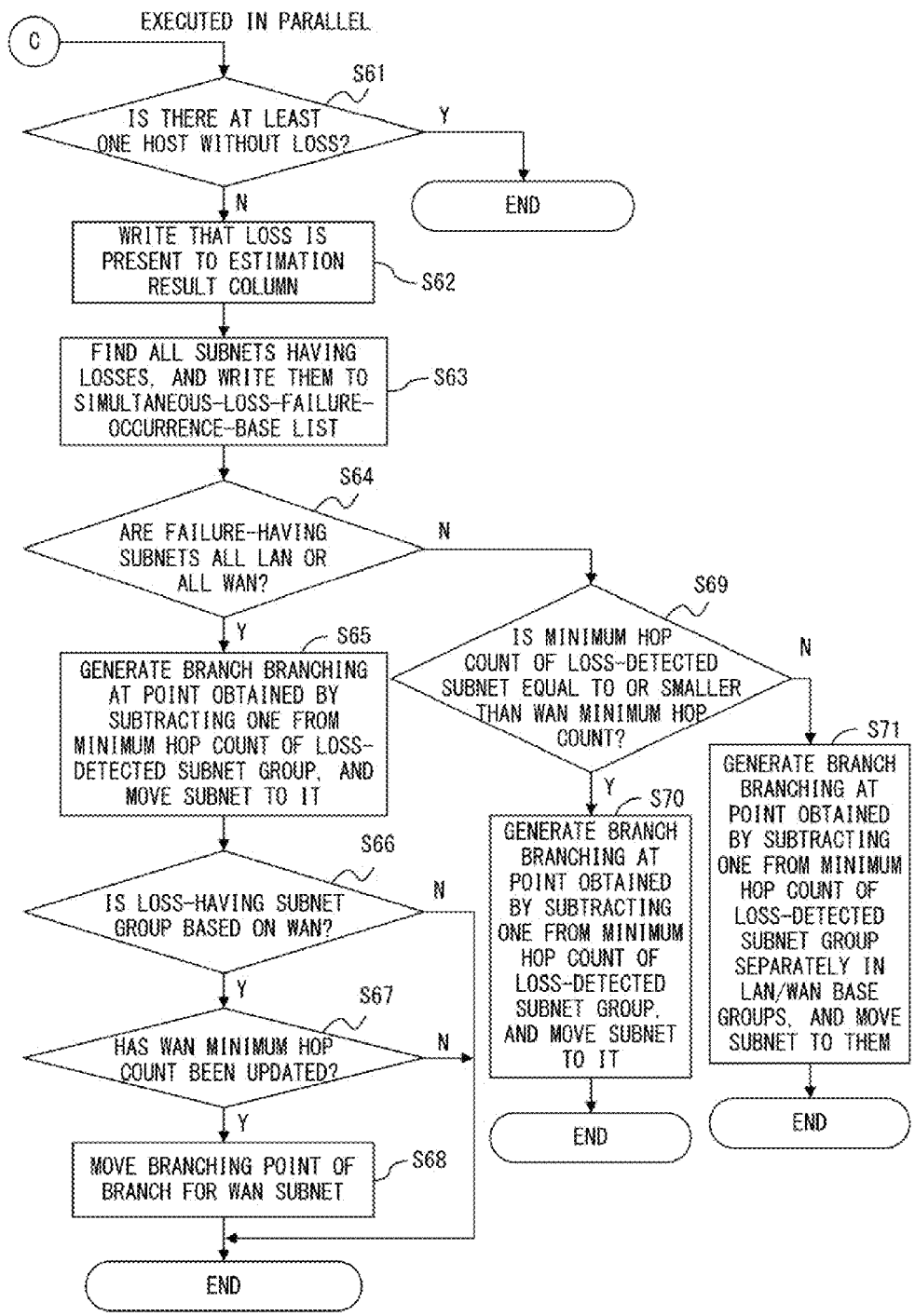
FIG. 14B illustrates a flowchart of a topology tree configuration process.

FIGS. 14A and 14B illustrate flowcharts for a topology tree configuration process. These flowcharts illustrate processes selected from the process executed by the network monitoring device 20 in order to generate or update, by referring to the subnet management information table 31, a topology tree that simulates the topology of the network 1. Process steps executed in this configuration are realized by the network monitoring device 20 executing a program for these steps (topology tree configuration program). The topology tree configuration unit 26 in the topology tree configuration portion is realized by the network monitoring device 20 executing this program. Next, FIGS. 14A and 14B are referred to so as to give detailed explanations for this configuration process.

In this configuration process, steps S41 through S51 in FIG. 14A and steps S61 through S71 in FIG. 14B are realized by the execution of different sub programs. Thus, two sub-routine processes are illustrated as this configuration process.

The process in step S1 in FIG. 13A is, for example, a main routine process, and in that main routine process, a process of confirming an update of the subnet management information table 31 is executed, for example, once in a prescribed time period. The two sub routine processes executed as this configuration process are executed by being called by the main routine process in accordance with the confirmation results. This calling corresponds to reporting, by the subnet information determination unit 25, of an update of the subnet management information table 31 to the topology tree configuration unit 26.

First, explanations will be given for the processes in steps S41 through S51. This series of processes is for locating subnets in the topology tree while changing target subnets without taking loss failures into consideration. By contrast, the series of the processes in steps S61 through S71 is for changing the arrangement of subnets in the topology tree in response to loss failures detected. The series of the processes in steps S41 through S51 corresponds to the process of generating the topology information 32, and the series of the processes in steps S61 through S71 corresponds to the process of updating the topology information 32.

First, in step S41, a target subnet, i.e., a target piece of subnet management information, is selected, and whether or not there are entries each having a different hop count stored in the hop count sub-column in the entry of the hop count estimation column is determined. When not all hop counts stored in the respective entries are the same, the determination result is YES, and the process proceeds to step S43. When all of such hop counts are the same, the determination result is NO, and it is determined that that hop count is to be stored in the hop count sub-column in the estimation result column in step S42. Thereafter, the process proceeds to step S45.

In step S43, it is determined whether or not there is an entry having "unknown" in the OS type sub-column among entries in the hop count estimation column. When there is such an entry, the determination result is YES, and the process proceeds to step S44, and that entry is ignored so that the hop counts are determined only for entries not having "unknown" in the OS type sub-columns. Thereafter, the process proceeds to step S45. For that determination, various methods can be used such as selecting the hop count that is the most common among the hop counts, selecting the hop count of the entry having the highest value in the packet number sub-column, or the like. When there is not an entry having "unknown" in the OS type sub-column, the determination result is NO, and it is determined that an error that cannot be responded to in the estimation of hop counts occurred so that an error output is conducted in order to report that fact, and thereafter the processes in and after step S41 are terminated.

In step S45, it is determined whether or not there is at least one LAN/WAN distinction sub-column containing "LAN" among entries in LAN/WAN columns. When there is an entry whose LAN/WAN distinction sub-column has "LAN" stored, the determination result is YES, and "LAN" is written to the LAN/WAN distinction sub-column in the estimation result column in step S46. Thereafter, the process proceeds to step S50. When there is not such an entry, in other words, when the all entries of the LAN/WAN distinction sub-columns are "WAN", the determination result is NO, and the process proceeds to step S47.

In this method, in the present embodiment, when there is an entry having "LAN" in the LAN/WAN distinction sub-column, the subnet is determined to be a LAN. This is because there is a possibility that some of the hosts in the subnets have a lowered transmission rate for some reason (such as being connected to a low-speed hub, temporal and abnormal increase in traffic, etc.). For this reason, each host is classified into a LAN or a WAN. This classification of each host makes it possible to classify subnets (to estimate bottleneck bandwidths) more accurately.

In step S47, "WAN" is written as the LAN/WAN distinction sub-column in the estimation result column. In the next step, S48, it is determined whether or not the hop count of the node located at the top of a WAN branch to which the node whose hop count has been newly determined belongs (referred to as "minimum hop count" hereinafter) has been updated to a smaller value. When the value obtained by subtracting one from this minimum hop count has been updated to a value smaller than the branching hop count managed as the branch management information of the corresponding WAN branch, the determination result is YES, the process proceeds to step S49, and this branch hop count is updated to a value obtained by subtracting one from the current minimum hop count. By this update, the node that branches a WAN branch (hereinafter, a node that branches a branch is generally referred to as a "branching node") is moved to the side of the network monitoring device 20. Thereafter, the process proceeds to step S50. When the value obtained by subtracting one from the minimum hop count has been updated into a value equal to or greater than the branching hop count, the determination result is NO, and the process proceeds to step S59. Thereby, moving of the branching node is avoided.

In step S50, the branch management information is referred to, and subnets (nodes) are arranged in the topology tree in accordance with the determined hop count and the classification about LAN and WAN. When doing this, if there are no locations at which a subnet is to be placed in the main tree or branches, a branch is generated so that the subnet is disposed in that branch. Thus, arrangements of subnets are performed by the addition of corresponding node management information and updating of the node management information of other subnets that is affected by that arrangement. In the next step, S51, a process for realizing a loop for a subnet that has not been processed is executed. That process is, for example, a determination process, and determines whether or not there is a subnet that has not been processed. When such a determination process is executed in step S51, the determination result is YES when there is a subnet that has not been processed, and the process returns to step S41. If there is not a subnet that has not been processed, the determination result is NO, and the processes in and after step S41 are terminated.

In the above described manner, in the present embodiment, the topology information 32 is newly generated instead of updating the existing topology information 32. This is because it is difficult to determine how much changes in results of estimation of hop counts and LAN/WAN distinction in a subnet influence an arrangement of other subnets. It is also possible to update (generate) the topology information 32 by accurately determining the scope of such influence so as to change only the arrangement of subnets within that scope. The branch management information is referred to for determining an arrangement because the result of arranging nodes in an existing branch is set to not be updated without a reason for the update. Thereby, as long as a reason for an update is not caused, topology trees generated in the past can be made again.

Here, a manipulation of topology trees whose necessity is caused by generating the new topology information 32, i.e., an update from a previous topology tree, will be explained specifically by using examples. That update is performed unconditionally when a subnet newly observed to have a packet appears. When there is not such a subnet, modifications vary depending upon the processes in steps executed before step S50 is executed.

When a subnet that is newly observed to have a packet has appeared, the position at which the node corresponding to that subnet is to be located is determined in accordance with the determined hop count and the result of the LAN/WAN classification. When there has already been a subnet having the same LAN/WAN classification result and the same hop count in the topology tree, a new branch is generated. When there are positions in the topology tree at which nodes can be located, the nodes are located at those positions. When such positions exist on an existing branch, the branch management information of that branch is updated. By newly arranging nodes in this manner, node management information is added, and node management information of other nodes affected by the arrangement is updated.

When the process has proceeded to step S50 from step S46 or step S48, positions at which nodes corresponding to the target subnet are to be located are determined in accordance with the determined hop count and the result of the LAN/WAN classification in the target subnet, and the nodes are positioned. Upon doing this, when a subnet having the same result of the LAN/WAN classification and the same hop count already exists in the topology tree, a branch is generated, and those subnets that should be arranged are arranged on the generated branch. Accordingly, there is a possibility that a manipulation of adding a branch will be performed.

As described above, because there is a possibility that the transmission rate has degraded for some reason, the LAN/WAN classification is conducted for each host. Thus, there is a possibility that the LAN/WAN distinction sub-column has been updated from WAN to LAN. A subnet (node) that has been classified into WAN has to be located on a branch. However, a subnet that has been classified into LAN is located in the main tree or a branch, taking into consideration other subnets that have also been classified into LAN. Accordingly, when the process has proceeded to step S50 from step S46, there is a possibility that a manipulation will be performed for a case where the LAN/WAN distinction sub-column has been updated from WAN into LAN. That manipulation could be, for example, moving a subnet newly classified into LAN from a WAN branch to the main tree or to other branches. Thus, when this manipulation is conducted, the branch management information is updated in addition to node management information of the node whose location is changed and other nodes affected by that change.

In the state illustrated in FIG. 9B, a WAN branch is branched from the main tree with the node 30v, which is next to the node 30a and is the fifth node from the network monitoring device 20 (the node whose branching hop count is five), serving as the branching node. The movement in step S49 of the branching subnet, i.e., the update of branching hop count, corresponds to a manipulation of branching a WAN branch with, for example, the node 30a serving as a new branching node. In such a case, pieces of node management information of all nodes constituting the WAN branch and of the branching node 30a are different from what they were previously. This is because at least hop counts have to be updated in all nodes. The branch management information is also updated.

Next, FIG. 14B is referred to in order to explain the processes in steps S61 through S71 in detail.

The processes in steps S61 through S71 illustrate the part performed targeting one subnet. Thus, the processes in steps S61 through S71 are also executed for each subnet by changing target subnets sequentially, similarly to the processes in steps S41 through S51.

When a loss failure has occurred on a subnet, it is considered, as has been described above, that loss failures have occurred also on other subnets that received packets that have been transmitted through the subnet having the failure. Thus, loss failures that have occurred are very useful information in determining the subnet group (or one subnet when a loss failure has occurred in a subnet corresponding to a leaf node) constituting the packets' transmission route. In the processes in steps S61 through S71, a tomography analysis on loss failures is used, paying attention to the above fact, and the topology of a portion that is affected by loss failures on the network 1 is estimated (determined), and the estimation result is reflected on the existing topology tree.

First, in step S61, data in the presence-or-absence-of-loss sub-column in each entry of a target subnet in the loss detection column is referred to so as to determine whether or not there is at least one piece of data that is "ABSENT". When there is at least one host in which a loss failure is not detected after performing detection of loss failure for each host belonging to the target subnet, the determination result is Yes, and the processes in and after step S61 are terminated. When loss failures are detected in all hosts, the determination result is No, and the process proceeds to step S62.

When the determination result in step S61 is YES, the same process as that in step S51 above is executed. Thereby, subnets that have not been a target are processed. This applies to a process of other steps whose movement destinations are terminals expressed as "termination". However, for convenience here, the processes identical to those in step S51 is not described.

In step S62, "PRESENT" is written as data in the presence-or-absence-of-loss sub-column in the estimation result column. In the next step, S63, all entries in which "PRESENT" is written as data in the presence-or-absence-of-loss sub-column, i.e., all entries including loss failures, are extracted, and the extracted subnets are written (registered) in the simultaneous-loss-failure-occurrence base list. In this manner, in step S64, which is executed after generating a new simultaneous-loss-failure-occurrence base list, whether or not written subnets are all LAN or all WAN is determined. When it is not estimated that all written subnets are LAN or WAN, the determination result is NO, and the process proceeds to step S69. When it is estimated that written subnets are all LAN or all WAN, the determination result is YES, and the process proceeds to step S65.

In the above manner, in the present embodiment, if there is, among entries in the loss detection column, at least one entry in which the presence-or-absence-of-loss sub-column contains "ABSENT", it is considered that a loss failure has not occurred in view of the entire subnet. This is because it is possible that a problem occurring in a transmission source has been detected as a loss failure. In other words, this is for highly accurately detecting subnets that have loss failures.

In step S65, the minimum hop count of the subnet group (at least one subnet) written to the simultaneous-loss-failure-occurrence base list is extracted, a branch having, as the branching node, a node whose hop count is a value obtained by subtracting one from the extracted hop count is generated as necessary, and that subnet group is moved (relocated) to the branch. This movement is conducted as described below. In this example, specific explanations will be given by referring to FIG. 9.

In FIG. 9B, when, for example, it is detected that only the node 30d on a WAN branch has a loss failure, the node 30d is moved to a branch having the previous node as the branching node. In order to avoid conflict with the hop count estimated in the leaf node located next to the node 30d, another node is located at the position that has been occupied by the node 30d. When loss failures are detected respectively in the first two nodes counting from the top of the WAN branch, those two nodes are moved to a WAN branch that is newly generated, and those new two nodes are located on the original WAN branch responding to the movement. Thereby, the state is updated to the state illustrated in FIG. 9C. Similarly, when a loss failure has been detected only in the node 30b in the main tree, the node 30b is moved to a branch (LAN branch) having the previous node as the branching node, and another node is located at the position that has been occupied by the node 30b.

When loss failures are detected in all nodes constituting a WAN branch or in at least one node connected to a leaf node (for example, the connection between the node 30d and the next leaf node), a branch does not need to be generated, and thus no nodes are moved.

In the above manner, in the present embodiment, a branch is generated as necessary so as to move to that branch at least one node in which loss failures have been detected, and thereby the connection relationship estimated from the loss failures between subnets is reflected on a topology tree. Thereby, topology trees with a higher accuracy can be obtained.

When a branch is generated, branch management information of the branch is generated, node management information of nodes to be moved and nodes affected by the movement is updated, and the branch management information of the branch on which the node to be moved to the generated branch were located is updated accompanying the generation.

In step S66, next to step S65, it is determined whether or not the subnet group observed to have loss failures is WAN. When all subnets written to the simultaneous-loss-failure-occurrence base list are determined to be WAN, the determination is YES, and the process proceeds to step S67. When at least one of the written subnets is determined to be LAN, the determination is NO, and the processes in and after step S61 are terminated.

In step S67, it is determined whether or not the minimum hop count of the Wan branch from which the node was moved has been updated. When the node located at the top of this WAN branch is moved to a newly generated WAN branch, the value obtained by subtracting one from the minimum hop count is greater than the branching hop count. Accordingly, the determination result is Yes, and the process proceeds to S68, where the branching hop count is updated to a value obtained by subtracting one from the current minimum hop count. Thereafter, the processes in and after step S61 are terminated. When the node located at the top of the WAN branch is not moved to a newly-generated WAN branch, the minimum hop count is equal to the branching hop count. Accordingly, the determination result is NO, and the processes in and after step S61 are terminated.

In step S69, it is determined whether or not the minimum hop count of a subnet group observed to have a loss failure is equal to or smaller than the minimum hop count of an existing branch on which a node of at least one of subnets that constitute that subnet group exists. When the value obtained by subtracting one from that minimum hop count is greater than the branching hop count, the determination result is NO, and the process proceeds to step S71. Thereby, after the processes in steps S70 and S71 are executed, the processes in and after step S61 are terminated.

In steps S70 and S71, a process is executed for the manipulating of the rearranging of nodes on detected subnets observed to have loss failures in the topology tree. An example of this rearrangement will be explained specifically by referring to FIGS. 10 through 12.

Figure 10:
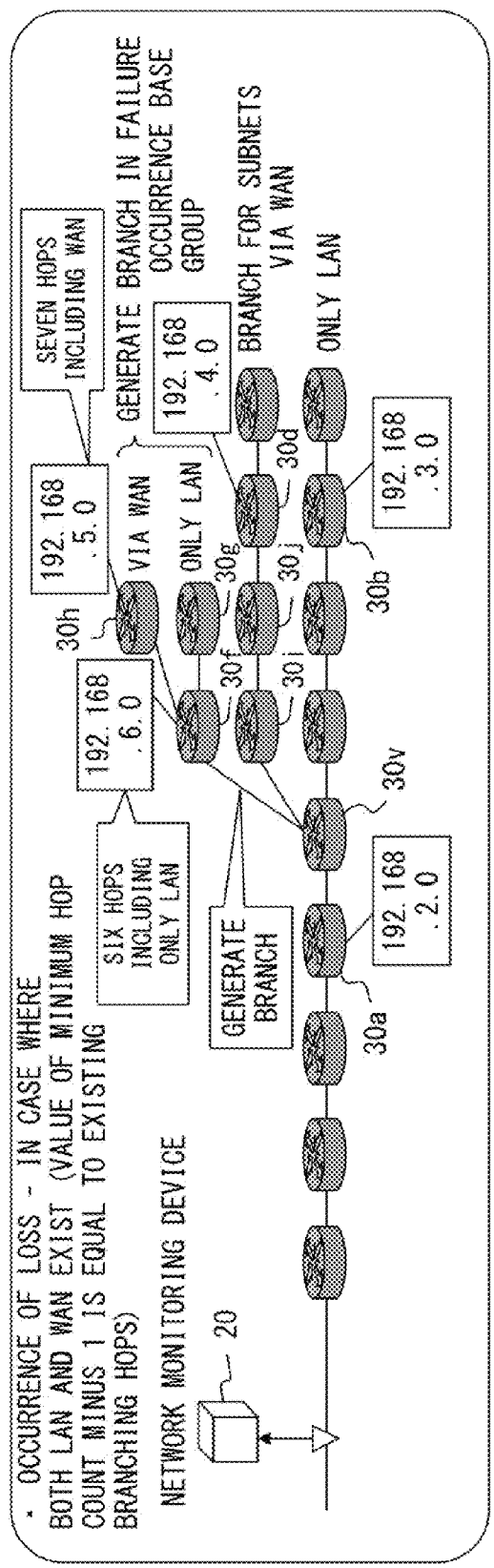
FIG. 10 illustrates an example of a manipulation performed on a topology tree when the minimum hop count of a subnet group in which loss failures were detected is equal to the minimum hop count of an existing branch.
Figure 11:
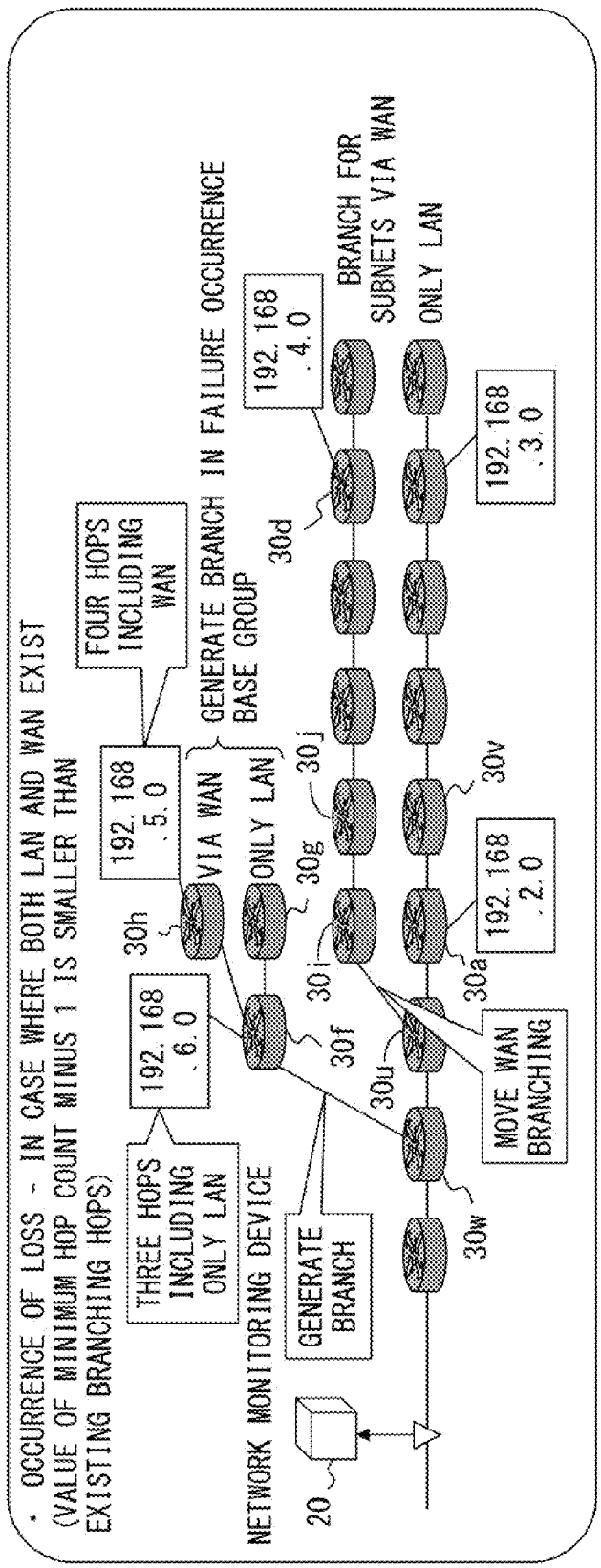
FIG. 11 illustrates an example of a manipulation performed on a topology tree when the minimum hop count of a subnet group in which loss failures were detected is smaller than the minimum hop count of an existing branch.

First, FIGS. 10 and 11 are referred to so as to explain manipulations executed by the process in step S70.

FIG. 10 illustrates an example of a manipulation performed when the minimum hop count of a subnet group in which loss failures were detected is equal to the minimum hop count of an existing branch. In FIG. 10, nodes 30f through 30h correspond to subnets in which loss failures are detected. In the arrangement of the nodes 30f through 30h before the manipulation, nodes 30f and 30g, for example, have been located at the positions of nodes 30i and 30j, and the node 30h has been located on the branch whose branching node is the node 30f at the position of the node 30*i*. These nodes 30*f* through 30*h* have been moved to the positions illustrated in FIG. 10 by rearranging nodes on the branch generated with the node 30*v* as its branching node. By the rearrangement of the nodes 30*f* and 30*g*, the nodes 30*i* and 30*j* are newly located at the original positions. These nodes 30*i* and 30*j* are for subnets classified into LAN, similarly to the nodes 30*f* and 30*g*.

In this example, the pieces of node management information for the nodes 30*g* and 30*d* in the topology information 32 are updated, and pieces for the nodes 30*i* and 30*j* are generated (added). The branch management information of a branch on which the node 30*i* has been newly located is updated, and a piece of branch management information for a newly generated branch is generated.

FIG. 11 illustrates an example of a manipulation performed when the minimum hop count of a subnet group in which loss failures were detected is smaller than the minimum hop count of an existing branch. In FIG. 11, an example is shown of a state where manipulations have been performed respectively on two subnet groups in which loss failures were detected. The node groups corresponding to these two subnet groups are nodes 30*f* through 30*h* (referred to as "first node group" hereinafter) and a node group constituting the branch on which the node 30*d* has been located (referred to as "second group" hereinafter). These two node groups had been arranged as illustrated, for example, in FIG. 10 before the detection of loss failures.

The minimum hop count (=branching hop count+1) of the first node group has been updated from six to three. Accordingly, the function of the branching node has been moved to the node 30*w* from the node 30*v*. The minimum hop count of the second node group has been updated from six to four. Thus, the function of the branching node has been moved to the node 30*u* to the node 30*v*. These changes in hop counts occur when packets have been transmitted using a roundabout route for some reason.

The hop count of the node 30*d* that constitutes the second node group has not changed in spite of this movement. Thus, only the difference between the minimum hop counts (i.e., 6−4=2) is added in front of the node 30*d*. In this manner, the hop count determined for each node is maintained in the topology tree.

In step S70, a process for realizing the above described manipulation in a topology tree is realized. In accordance with the manipulation, the branch management information that should be updated is updated and the node management information that should be updated in the topology information 32 is updated.

Figure 12:
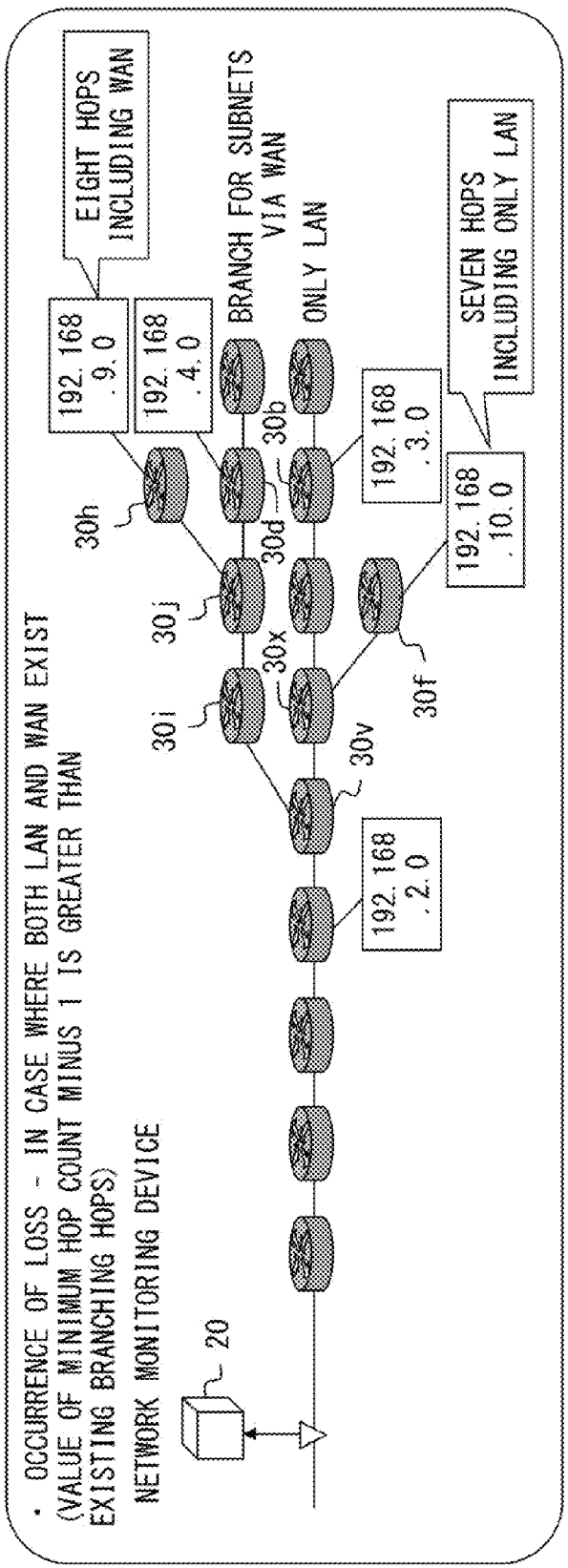
FIG. 12 illustrates an example of a manipulation performed on a topology tree when the minimum hop count of the subnet group in which loss failures were detected is greater than the minimum hop count of an existing branch.

Next, FIG. 12 is referred to so as to explain manipulations realized by the process in step S71. FIG. 12 explains an example of a manipulation performed when the minimum hop count of the subnet group in which loss failures have been detected is greater than the minimum hop count of an existing branch. In FIG. 12, the nodes rearranged on the basis of the detection of the loss failures are node 30*f* and node 30*h*. The original positions respectively of the two nodes 30*f* and 30*h* are, for example, positions illustrated in FIG. 10.

In the present embodiment, when the minimum hop count of a subnet group in which loss failures have been detected is greater than the minimum hop count of an existing branch, rearrangement is performed in accordance with whether the branch is a LAN or a WAN. Thus, the nodes 30*f* and 30*h* are rearranged on the generated branches, and the branches on which these nodes 30*f* and 30*h* have been located are deleted. The hop count of the node 30*f* is updated from six to seven, and the hop count of the node 30*h* is updated from seven to eight. Thus, a branch using the node 30*x* as the branching node is generated, and the node 30*f* has been moved to that generated branch. Similarly, a branch using the node 30*j* as the branching node is generated, and the node 30*h* has been moved to that generated branch.

In step S71, a process for realizing the above described manipulations in a topology tree is performed. In accordance with the manipulations, the piece of branch management information that should be generated is generated, the piece of branch management information that should be deleted is deleted, and the piece of node management information that should be updated is updated.

In the present embodiment, the above described process of configuring a topology tree is repeatedly executed, for example, at regular time intervals. By the repeated executions, arrangement or/and rearrangement of nodes and addition, deletion or/and movement of branches are conducted as necessary. As a result of this, topologies that are generated can gradually be modified to accurate ones. Thereby, when modifications are not conducted or are rarely conducted it means that a highly accurate topology tree has already been obtained.

There are many types of manipulations for resolving inappropriate arrangement by using loss failures other than the manipulation explained by referring to FIGS. 9 through 12. Therefore, the above exemplary manipulation is an example, and the scope of the present invention is not limited to the above exemplary manipulation.

A program according to the present embodiment (topology tree generation program) includes, as sub programs, the packet analysis program for realizing the packet analysis process illustrated in FIGS. 13A through 13C, and the topology tree configuration program for realizing the topology tree configuration process illustrated in FIGS. 14A and 14B. The functional configuration illustrated in FIG. 2 is realized by causing a computer used as the network monitoring device 20 to execute the program according to the present embodiment. Here, FIG. 15 is referred to so as to specifically explain a computer to which the present embodiment can be applied, i.e., a computer that can be used as the network monitoring device 20 (a topology tree generation apparatus) by executing this program.

The computer illustrated in FIG. 15 includes a CPU 61, a memory device 62, an input device 63, an output device 64, an external storage device 65, a media driving device 66, and a network connection device 67, all of which are connected to each other via a bus 68. The configuration illustrated in FIG. 15 is an example, and is not intended to limit the scope of the present invention.

The CPU 61 controls the entire computer.

The memory device 62 is a semiconductor memory device such as RAM or the like that temporarily stores programs or data stored in the external storage device 65 (or a portable storage medium 70) upon executions of such programs, updating of such data, or the like. The CPU 61 reads such programs onto the memory device 62 to execute them so as to control the entire computer.

The input device 63 is an interface that can be connected to an operating device such as a keyboard, a mouse, or the like. The input device 63 detects operations performed by the users on the connected operating device, and reports the detection result to the CPU 61.

The output device 64 is a display control device that is connected to, for example, a display device. The network connection device 67 can perform communications via, for example, the network 1, and receive packets flowing through the network 1. The external storage device 65 is, for example, a hard disk device. This is used mainly for storing various data and programs.

The media driving device 66 accesses the portable storage medium 70 such as an optical disk, a magneto-optical disk, or the like.

The above topology tree generation program is stored in the external storage device 65 or the portable storage medium 70, or is obtained by the network connection device 67 via the network 1. By the CPU 61 reading that topology tree generation program onto the memory device 62 to execute it, the topology tree generation device included in the network monitoring device 20 is realized. The subnet management information table 31, the topology information 32, and the subnet mask information 35 are stored in, for example, the external storage device 65, and are read onto the memory device 62 as necessary. Outputting of the topology information 32 is performed by, for example, displaying it through the output device 64, transmitting it to an external device via the network connection device 67, or storing it in the portable storage medium 70 via the media driving device 66.

When this topology tree generation program is assumed to be stored in the external storage device 65, the packet capture unit 21 is realized by the CPU 61, the memory device 62, the external storage device 65, the network connection device 67, and the bus 68. The hop count analysis unit 22, the bottleneck bandwidth analysis unit 23, the loss failure detection unit 24, the subnet information determination unit 25, and the topology tree configuration unit 26 are realized by, for example, the CPU 61, the memory device 62, the external storage device 65, and the bus 68.

Although the present embodiment is realized by being installed in the network monitoring device 20, it can be realized by being installed in other apparatuses, or can be realized in a form of a dedicated apparatus. Also, procedures in updating the subnet management information or the topology tree are not limited to the above described procedures. For example, it is also possible to perform modifications of an arrangement of nodes in which loss failures have not been detected in order to resolve an inappropriate arrangement revealed by detected loss failures instead of resolving the inappropriate arrangement by modifying an arrangement of nodes in which loss failures have been detected. Methods of resolving inappropriate arrangements are not limited to particulars.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A topology tree generation apparatus that generates a topology tree simulating a configuration of a network including subnets connected to each other, the apparatus comprising
    a processor that performs a topology tree generation process including:
        a packet obtainment process that obtains a packet flowing through the network;
        an analysis process that determines a hop count, which is the number of nodes which the packet has passed through, and a bottleneck bandwidth, which is a bottleneck for transmitting the packet, the determination being performed for each of transmission source subnets which transmitted the packet, from the packet obtained by the packet obtainment process, and that determines the bottleneck bandwidth for each data processing apparatus that transmitted the packet among the transmission source subnets, and that classifies, on the basis of a result of determination of the bottleneck bandwidth, each of the data processing apparatus into either a first type or a second type which are different in transmission rate, and that classifies each of the transmission source subnets into either the first type or the second type on the basis of a result of the classification for each of the data processing apparatuses, and that detects a loss failure by which the packet is lost;
        an arrangement process that arranges, in a topology tree, on the basis of the hop count and the bottleneck bandwidth determined by the analysis process, subnets which have been confirmed to be the transmission source subnets among subnets existing in the network; and
        an arrangement modification process that uses a result of loss failure detection by the analysis process to extract a subnet that has been inappropriately arranged among subnets arranged by the arrangement process in the topology tree and to modify an arrangement of the extracted subnets of which a loss failure is detected.

2. The topology tree generation apparatus according to claim 1, wherein:
    the arrangement modification process extracts subnets that constitute a transmission route of a packet transmitted from a subnet in which the loss failure has not been detected in the topology tree among the subnets detected by the analysis process as inappropriate subnets including the loss failures.

3. The topology tree generation apparatus according to claim 2, wherein:
    the arrangement modification process newly generates one or more branches, and moves at least one of the inappropriate subnets to the generated branch when at least one of the inappropriate subnets constitutes part of a branch.

4. The topology tree generation apparatus according to claim 1, wherein:
    the analysis process determines the hop count for each data processing apparatus that transmitted the packet from among the transmission source subnets, and determines the hop count of the transmission source subnet from the determination result of each data processing apparatus.

5. A computer-readable, non-transitory medium storing a program that makes a computer be used as a topology tree generation apparatus that generates a topology tree simulating a configuration of a network including subnets connected to each other, comprising:
    a packet obtainment function that obtains a packet flowing through the network;
    an analysis function that determines a hop count, which is the number of nodes which the packet has passed through, and a bottleneck bandwidth, which is a bottleneck for transmitting the packet, the determination being performed for each of transmission source subnets which transmitted the packet, from the packet obtained by the packet obtainment function, and that determines the bottleneck bandwidth for each data processing apparatus that transmitted the packet among the transmission source subnets, and that classifies, on the basis of a result of determination of the bottleneck bandwidth, each of the data processing apparatus into either a first type or a second type which are different in transmission rate, and that classifies each of the transmission source subnets into either the first type or the second type on the basis of a result of the classification for each of the data processing apparatuses, and that detects a loss failure by which the packet is lost;

an arrangement function that arranges, in a topology tree and on the basis of the hop count and the bottleneck bandwidth determined by the analysis function, subnets which have been confirmed to be the transmission source subnets among subnets existing in the network; and an arrangement modification function that uses a result of loss failure detection by the analysis function to extract a subnet that has been inappropriately arranged among subnets arranged by the arrangement function in the topology tree and to modify an arrangement of the extracted subnets of which a loss failure is detected.

6. A method of generating, by using a computer, a topology tree simulating a configuration of a network including subnets connected to each other, the method comprising:

obtaining a packet flowing through the network;

determining a hop count, which is the number of nodes which the packet has passed through, and a bottleneck bandwidth, which is a bottleneck for transmitting the packet, the determining being performed for each of transmission source subnets which transmitted the packet, from the packet obtained by the obtaining;

determining the bottleneck bandwidth for each data processing apparatus that transmitted the packet among the transmission source subnets;

classifying, on the basis of a result of determination of the bottleneck bandwidth, each of the data processing apparatus into either a first type or a second type which are different in transmission rate;

classifying each of the transmission source subnets into either the first type or the second type on the basis of a result of the classification for each of the data processing apparatuses;

detecting a loss failure by which the packet is lost;

arranging, in a topology tree, on the basis of the hop count and the bottleneck bandwidth determined by the determining, subnets which have been confirmed to be the transmission source subnets among subnets existing in the network; and using a result of loss failure detection by the detecting to extract a subnet that has been inappropriately arranged among subnets arranged by the arranging in the topology tree and to modify an arrangement of the extracted subnets of which a loss failure is detected.

7. The topology tree generation apparatus according to claim 1, wherein:

the arrangement process generates, in the topology tree, a branch, in which subnets of a same type in transmission rate on the basis of a result of the classification by the analysis process are arranged, in accordance with a determined hop count.

8. The topology tree generation apparatus according to claim 1, wherein:

the analysis process classifies a certain transmission source subnet into the first type when at least one of data processing apparatuses which transmitted the packet is classified into the first type in the certain transmission source subnet.

9. The topology tree generation apparatus according to claim 1, wherein:

the analysis process classifies a certain transmission source subnet into the first type when data processing apparatuses classified into the first type are larger in number than data processing apparatuses classified into the second type in the certain transmission source subnet, and classifies the certain transmission source subnet into the second type when data processing apparatuses classified into the second type are larger in number than data processing apparatuses classified into the first type in the certain transmission source subnet.

10. The computer-readable, non-transitory medium according to claim 5, wherein:

the arrangement function generates, in the topology tree, a branch, in which subnets of a same type in transmission rate on the basis of a result of the classification by the analysis function are arranged, in accordance with a determined hop count.

11. The computer-readable, non-transitory medium according to claim 5, wherein:

the analysis function classifies a certain transmission source subnet into the first type when at least one of data processing apparatuses which transmitted the packet is classified into the first type in the certain transmission source subnet.

12. The computer-readable, non-transitory medium according to claim 5, wherein:

the analysis function classifies a certain transmission source subnet into the first type when data processing apparatuses classified into the first type are larger in number than data processing apparatuses classified into the second type in the certain transmission source subnet, and classifies the certain transmission source subnet into the second type when data processing apparatuses classified into the second type are larger in number than data processing apparatuses classified into the first type in the certain transmission source subnet.

13. The method according to claim 6, further comprising:

generating, in the topology tree, a branch, in which subnets of a same type in transmission rate on the basis of a result of the classification by the analysis process are arranged, in accordance with a determined hop count.

14. The method according to claim 6, wherein:

in the classifying each of the transmission source subnet, a certain transmission source subnet is classified into the first type when at least one of data processing apparatuses which transmitted the packet is classified into the first type in the certain transmission source subnet.

15. The method according to claim 6, wherein:

in the classifying each of the transmission source subnet, a certain transmission source subnet is classified into the first type when data processing apparatuses classified into the first type are larger in number than data processing apparatuses classified into the second type in the certain transmission source subnet, and the certain transmission source subnet is classified into the second type when data processing apparatuses classified into the second type are larger in number than data processing apparatuses classified into the first type in the certain transmission source subnet.

* * * * *